United States Patent
Rtischev et al.

(10) Patent No.: US 6,302,695 B1
(45) Date of Patent: Oct. 16, 2001

(54) METHOD AND APPARATUS FOR LANGUAGE TRAINING

(75) Inventors: Dimitry Rtischev, Menlo Park; Philip L. Hubbard, Stanford; Leonardo Neumeyer, Palo Alto; Kaori Shibatani, San Francisco, all of CA (US)

(73) Assignee: Minds and Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/473,550

(22) Filed: Dec. 28, 1999

Related U.S. Application Data

(60) Provisional application No. 60/164,433, filed on Nov. 9, 1999.

(51) Int. Cl.⁷ ................................................. G09B 19/06
(52) U.S. Cl. ............................................. 434/157; 434/156
(58) Field of Search ................................... 434/156, 157, 434/167

(56) References Cited

U.S. PATENT DOCUMENTS

| | | | |
|---|---|---|---|
| 2,777,901 | * | 1/1957 | Dostert ............................. 434/157 X |
| 5,503,560 | * | 4/1996 | Stentiford ........................ 434/167 X |
| 5,766,015 | * | 6/1998 | Shpiro .............................. 434/156 X |
| 5,810,599 | * | 9/1998 | Bishop ............................. 434/157 X |
| 5,882,202 | * | 3/1999 | Sameth et al. .................... 434/157 X |
| 5,885,083 | * | 3/1999 | Ferrell ............................. 434/156 X |
| 6,077,085 | * | 6/2000 | Parry et al. ....................... 434/322 X |

* cited by examiner

Primary Examiner—Valencia Martin-Wallace
Assistant Examiner—Chanda Harris
(74) Attorney, Agent, or Firm—Townsend & Townsend & Crew LLP

(57) ABSTRACT

A method for language fluency training on a computer system having an audio output device includes invoking a web browser program, receiving a pre-recorded file including a message in a spoken language from a conversation partner, playing the message to a user seeking fluency training in the spoken language from within the web browser program on the audio output device, asynchronously with playing the message, recording a user file including a message in the spoken language from the user in response to the message from within the web browser program, outputting the user file to the conversation partner and to a language instructor, receiving an instruction file including an instruction message in the spoken language from the language instructor in response to the user message and playing the instruction message to the user from within the web browser program on the audio output device.

25 Claims, 19 Drawing Sheets

METHOD AND APPARATUS FOR LANGUAGE TRAINING

CROSS-REFERENCE TO RELATED APPLICATIONS

The present invention disclosure claims priority to Provisional U.S. Patent Application No. 60/164433, filed Nov. 9, 1999, entitled METHOD AND APPARATUS FOR FOREIGN LANGUAGE FLUENCY. This application is herein by incorporated by reference for all purposes.

METHOD AND APPARATUS FOR LANGUAGE TRAINING NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office file or records, but otherwise reserves all copyright rights whatsoever.

BACKGROUND OF THE INVENTION

The present invention relates to language training. More specifically, the present invention relates to improved methods and apparatus for fluency training in spoken human languages.

Prior art solutions for fluency training in a spoken language have been via synchronous conversations between language teachers and students. Such conversations are considered synchronous because of the real-time interaction between the language teachers and students. Such training has been typically carried out by face to face classroom situations or other types of meetings such as over the telephone, via a video link, and the like.

Drawbacks to synchronous conversation include that it requires both the language teachers and students to coordinate their schedules so they can practice. This drawback is especially large where the teacher and the student are widely geographically separated. As an example, it would be very difficult for a language teacher in New York to continuously communicate with a student in Tokyo.

Another drawback is the difficulty for students in a geographic areas to find a large number of language teachers in a desired language also in the same geographic area. For example, the number of language teachers in Ethiopian is not believed to be very high in Waco, Tex.

Another drawback is that it has been found that synchronous conversations often place students under a high amount of stress. Accordingly, in such situations, students tend to use easier and simpler phrases while speaking, and thus students do not develop or practice more complex phrases. As a result, the students do not readily achieve the fluency in the language they truly desire.

Another drawback is that synchronous conversation is more expensive because the teacher needs to be paid while the student is thinking/speaking and repeating, etc.

Another solution for fluency training has been through the use of audio tapes. In particular, language teachers and students record messages on audio tapes, and pass the tapes to the other party. For example, a language teacher will record a message on an a tape and pass the tape to the student. The student in turn picks up the tape, listens to the tape, records a message for the language teacher, and passes the tape to the language teacher.

This solution has the same drawback as other solutions. In particular, it limits the language teacher and the student to be in roughly the same geographic area so that many messages can be exchanged. If the language teacher and the student are too far apart, the round trip time between taped messages would be quite long, thus fluency would be obtained very slowly, if at all.

Other drawbacks to prior art solutions have been that the language teacher must perform two different roles. In particular, the language teacher must be both a conversation partner and a language teacher. As a teacher, the language teacher must instruct the student as to proper use of the language, and as a conversation partner, the language teacher must provide conversation that is entertaining and interesting to the student. However, most language teachers often find the former role is much easier to play than the latter. For the students, finding a language teacher who is both a good teacher and an interesting conversation partner greatly restricts the number of qualified language teachers to choose from.

Another drawback to the two different roles the language teacher must play is that paying a language teacher to play a mere conversation partner is not cost effective. For example, students can usually find conversation partners among their friends, and the like. Yet another drawback is that when students converse with teachers, it often alters the students' psychology of the interaction because the students know the teachers will correct the students' mistakes. As a result, the conversations tend to be simpler and less complex, and again fluency is difficult to achieve.

Thus, what is required are improved techniques and systems that enable language fluency training.

SUMMARY OF THE INVENTION

The present invention relates to language training. More specifically, the present invention relates to methods and apparatus for language fluency training.

The embodiments of the present invention enables an economically and useful division of labor such that the student (or learner) obtains enjoyable, realistic conversations from a conversation partner and separately obtains useful feedback on these conversations from a teacher.

The invention includes a client-server computer system coupled via a network, such as the Internet. This enables asynchronous spoken message exchange between geographically disperse groups of learners, conversation partners, and teachers for the purpose of training the learners to become fluent in a desired spoken language. The embodiments of the present invention incorporate non-obvious, novel, and useful elements.

According to an embodiment of the present invention, a method for language fluency training on a computer system having an audio output device includes invoking a web browser program, receiving a pre-recorded file including a message in a spoken language from a conversation partner, and playing the message to a user seeking fluency training in the spoken language from within the web browser program on the audio output device. The method also includes asynchronously with playing the message, recording a user file including a message in the spoken language from the user in response to the message from within the web browser program, and outputting the user file to the conversation partner and to a language instructor. Receiving an instruction file including an instruction message in the spoken language from the language instructor in response to the user message, and playing the instruction message to the user from within the web browser program on the audio output device are also performed.

According to another embodiment of the present invention, a computer program product for a computer system including a processor, and an audio output device, for language fluency training is disclosed. The computer program product includes code that directs the processor to receive a recorded message in a spoken human language from a conversation partner, and code that directs the processor to play the recorded message with the audio output device to a user who is not fluent in the spoken human language. The computer program product also includes code that directs the processor to record a user message in the spoken human language from the user after the recorded message is played, and code that directs the processor to send the user message to the conversation partner and to a language instructor. Code that directs the processor to receive an instruction message from the language instructor, the instruction message responsive to the user message, and code that directs the processor to play the instruction message with the audio output device to the user are also contemplated. The codes reside on a tangible media.

According to yet another embodiment, a computer system for language fluency training includes a processor, an audio output device coupled to the processor, and a readable memory coupled to the processor. The readable memory includes code that implements a web browser, code that directs the processor to store a recorded file comprising speech in a spoken language from a conversation partner, and code that directs the processor to play the recorded file to a user desiring to be fluent in the spoken language with the audio output device. The readable memory also includes code that directs the processor to record a user file comprising speech from the user in the spoken language, the user file formed after the recorded file has been played, and code that directs the processor to send the user file to the conversation partner and to a language instructor. Code that directs the processor to store an instruction file from the language instructor, the instruction file formed in response to the user file, and code that directs the processor to play the instruction file to the user with the audio output device are also provided.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DESCRIPTION OF THE SPECIFIC EMBODIMENTS

Figure 1:
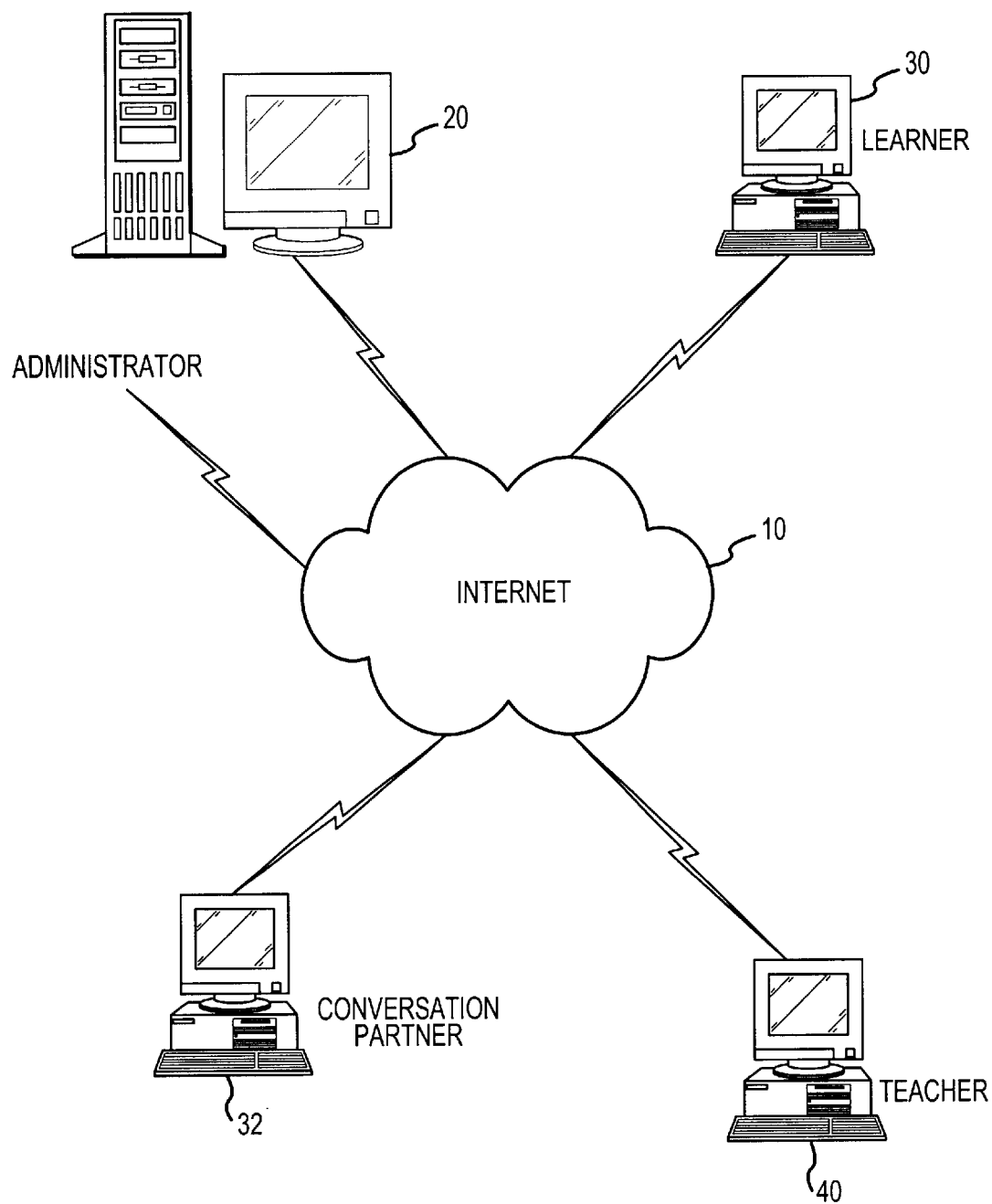
FIG. 1 is a simplified overview diagram of a language fluency system according to an embodiment of the present invention.

FIG. 1 is a simplified overview diagram of a language fluency system according to an embodiment of the present invention. This diagram is merely an illustration which should not limit the scope of the claims herein. One of ordinary skill in the art would recognize many other variations, modifications, and alternatives.

FIG. 1 illustrates a computer network 10 coupled to a computer server 20 and to computer network devices 30, 32, and 40, among other devices. Computer network devices 30, 32, and 40 typically include software therein enabling users to receive data from and transmit data to computer network 10. Not shown is an administrator that can control computer server 20.

In the present embodiment, computer network 10 is the Internet. In alternative embodiments of the present invention, computer network 10 may be any computer network, such as an intranet, a wide area network, a local area network, an internet, and the like. Computer network 10 provides data communication among computer network devices 30, 32, 40 and computer server 20. As will be described further below, data communication may include transfer of HTML based data, textual data, plug-in programs or viewers, applets, audio data, video data, and the like. Although computer network 10 is illustrated as a single entity, it should be understood that computer network 10 may actually be a network of individual computers and servers.

Computer server 20 is embodied as a web server on computer network 10.

In the present embodiment, computer server 20 provides HTML-based data such as web pages, plug-in programs or viewers, applets, or servlets, such as Java and ActiveX applets, audio/visual/textual data, as will be described below, and the like. Many other types of data may also be provided, for example, database entries, and the like. These data are provided to other computers such as network devices 30, 32, and 40. Computer server 20 is also configured to receive submissions, such as text data files, audio data files, video data files, form-based submissions, and the like from computer network devices 30, 32, and 40.

In the present embodiment, computer network devices 30, 32, and 40 are typically coupled directly to computer network 10, or indirectly to computer network 10 via an Internet service provider (ISP), or the like. For example, a computer network device may be a computer coupled through a corporate firewall to computer network 10, a set-top box coupled via a modem and an ISP to computer network 10, a network computer coupled through a router to computer network 10, a personal computer coupled via a digital subscriber line, cable modem, and the like to computer network 10, and the like.

A computer network device implementing an embodiment of the present invention typically includes web browser software operating thereon, as will be described below. The web browser software typically provides a graphical user interface allowing users to easily interact with data available on computers such as computer server 20, on computer network 10. For example, the web browser software allows the user to view web pages from computer server 20, provides execution of plug-in programs (viewers) or applets, from computer server 20, enables the user to submit form data, hear audio playback of data files, view video playback of video files, and other types of data from computer server 20, and the like. Many other operations are provided by web browser software, and are known to one of ordinary skill in the art.

Figure 2:
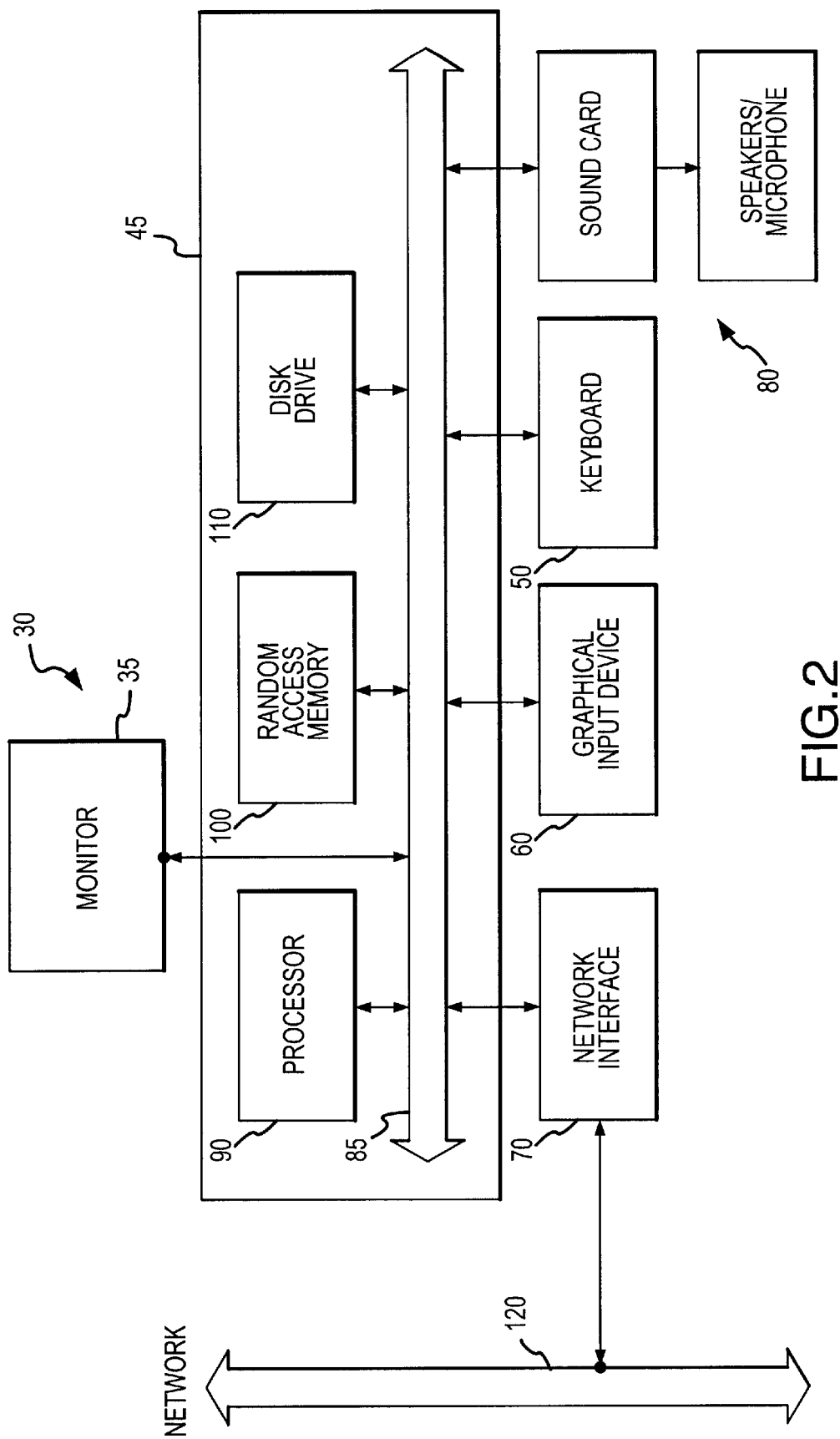
FIG. 2 is a block diagram of a typical computer network device according to an embodiment of the present invention.

FIG. 2 is a block diagram of a typical computer network device 30 according to an embodiment of the present invention. Computer network device 30 typically includes a monitor 35 a computer 45, a keyboard 50, a graphical input device 60, a network interface 70, and audio input/output devices 80.

Computer 45 includes familiar computer components such as a processor 90, and memory storage devices, such as a random access memory (RAM) 100, a disk drive 110, and a system bus 85 interconnecting the above components.

Graphical input device 60 is typically embodied as a computer mouse, a trackball, a track pad, wireless remote, and the like. Graphical input device 60 typically allows the users to graphically select objects, icons, text and the like output on monitor 35 in combination with a cursor. For example, users graphically select buttons or icons on monitor 35 as illustrated in the examples below to hear and record audio and textual messages.

Embodiments of network interface 70 include an Ethernet card, a modem (telephone, satellite, cable, ISDN), (asynchronous) digital subscriber line (DSL) units, and the like. Network interface 70 is coupled to network 120.

RAM 100 and disk drive 110 are examples of tangible media for storage of data, audio message files, computer programs, browser software, embodiments of the herein described applets, applet interpreters or compilers, virtual machines, and the like. Other types of tangible media include floppy disks, removable hard disks, optical storage media such as CD-ROMS and bar codes, semiconductor memories such as flash memories, read-only-memories (ROMS), and battery-backed volatile memories, and the like. In embodiments of the present invention such as set top boxes, mass storage, such as disk drive 110, and the like may be dispensed with.

Audio input/output devices 80 are typically embodied as microphones, or the like; speakers, headphones, and the like; in conjunction with an analog/digital sound board. As will be described in embodiments below, a user typically records spoken messages into the computer in digital form via a microphone and a sound board. Further, the user also typically listens to spoken messages in analog form via a sound board and speakers.

In one embodiment, computer network device 30 includes a PC compatible computer having an x86 based microprocessor, such as an Athlon™ microprocessor from Advanced Micro Devices, Inc. Further, in the present embodiment, computer network device typically includes Window™ (Windows95™, Windows98™, Windows NT™) operating system from Microsoft Corporation.

In the present embodiment, web browser software are typically separate applications programs from the operating system. The web browser software may be embodied as Netscape Navigator™ 4.x, Microsoft's Internet Explorer™ 5.x, or the like. In the present embodiments, web browser software includes virtual machines that enable interpreting of applets downloaded from computer network 10. For example, one virtual machine is Java virtual machine, version 1.1, or later; in another example, virtual machine is an ActiveX virtual machine; and the like. In alternative embodiments, just-in-time compilers may also be used for enabling executing of downloaded applets.

FIG. 2 is representative of but one type of system for embodying the present invention. It will be readily apparent to one of ordinary skill in the art that many other hardware and software configurations are suitable for use with the present invention. For example, other types of processors are contemplated, such as the PentiumJ-class or a CeleronJ-class microprocessor from Intel Corporation, K6-x -class microprocessors from Advanced Micro Devices, PowerPC G3, G4 microprocessors from Motorola, Inc., and the like. Further, other types of operating systems are contemplated, such as LINUX, UNIX, MAC OS 9 from Apple Computer Corporation, BeOS, and the like.

Set top boxes, such as those provided by WebTV Networks, Incorporated, and the like, may also be used in embodiments of the present invention. Set top boxes may include cable reception boxes, satellite reception boxes, network computers, game consoles, and other types of units incorporating processors, microcontrollers, ASICs, and the like.

Figure 3:
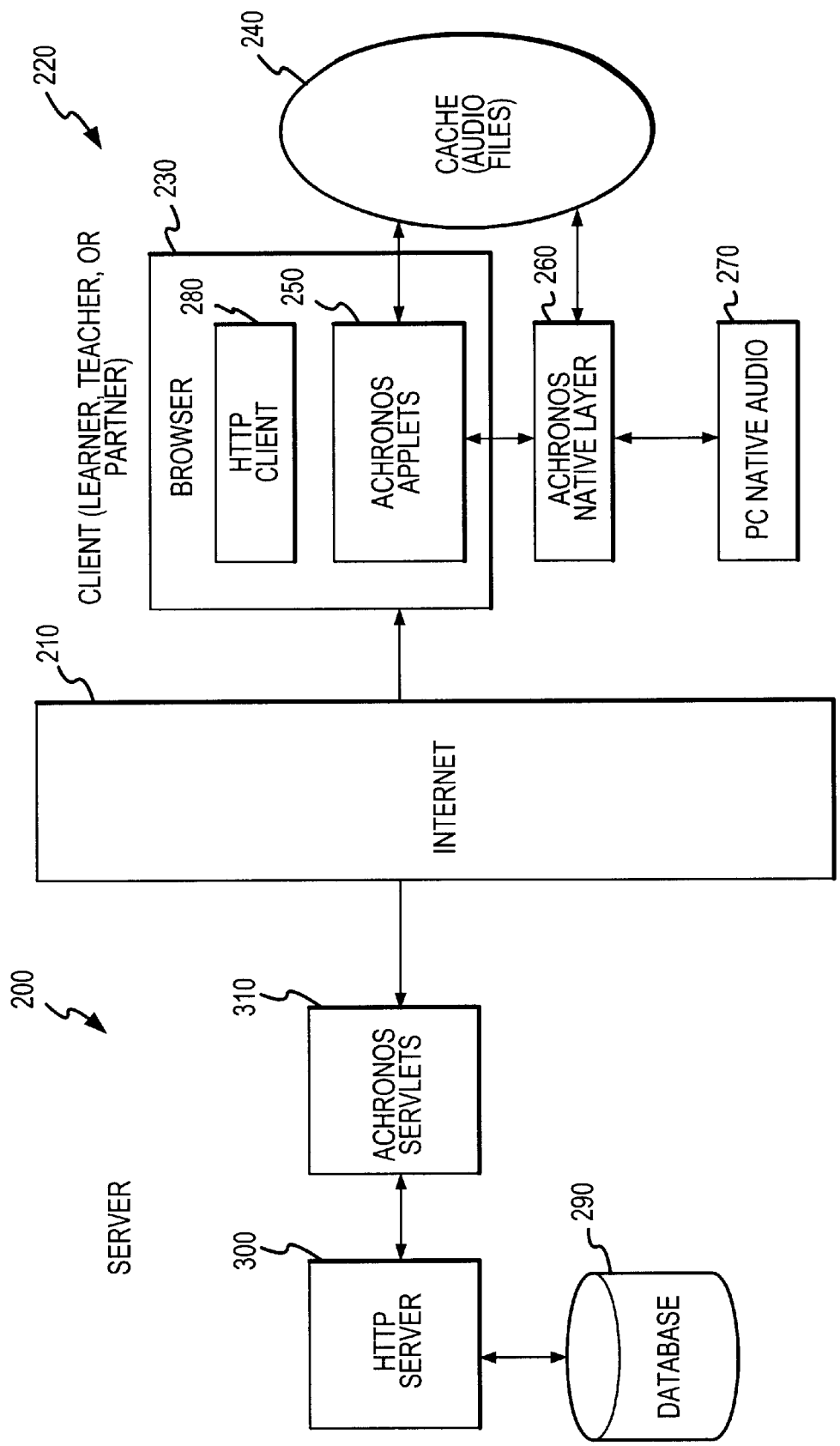
FIG. 3 is a more detailed description of the architecture of the system.

FIG. 3 is a more detailed description of the architecture of the system. FIG. 3 includes a server computer 200 logically coupled via a computer network 210 to a client computer 220. In this embodiment, computer network 210 may be any computer network, such as the Internet.

In FIG. 3, client computer 220 is typically embodied as described above in FIG. 2. Logically, client computer 220 includes a web browser 230, a cache 240, client software 250 and 260, and audio drivers 270. Web browser 230 typically includes Hypertext transfer protocol (HTTP) client software 280.

As described above, web browser 230, excluding client software 250 and 260, are typically pre-installed in client computer 220. Audio drivers 270 are typically system level drivers typically provided by the operating system.

In the present embodiment, client software 250 and 260 are downloaded into client computer 220, typically from server computer 200. In alternative embodiments, client software 250 and 260 may be provided by other sources such as from download sites such as: www.zdnet.com, www.downloads.com, or the like. Further, client software 250 and 260 may be loaded from a disk, such as a CD, a floppy disk, a network drive, and the like.

Client software 250 and 260 are typically termed "plug-in" programs for web browser 230. In one example, client software 250 and 260 are typically applets written in Microsoft's ActiveX. In alternative embodiments of the present invention, client software 250 and 260 may be Java-based applets, or others. In the present embodiment, client software 250 and 260 are typically on the order of a 60 Kbyte download. In alternative embodiments, with optimizations and/or expansions in functionality, the size of client software 250 and 260 may be smaller or larger than 60 Kbytes.

Client software 250 and 260 may be downloaded and installed into client computer 220 prior to coupling client computer 220 to computer network 210, or may be downloaded and installed into client computer 220, on the fly. As an example of the latter, client software 250 and 260 may be downloaded onto client computer 220 every time client computer 220 is coupled to server computer 200. In other embodiments of the present invention, client software 260 is initially downloaded and installed into client computer 220 as a web browser plug-in application, and client software 250 is dynamically downloaded as an applet when client computer 220 is coupled to server computer 200.

Cache 240 represents a memory that typically stores audio data downloaded from server computer 200. The audio data is typically automatically downloaded from server computer 200 when client computer 220 begins a session with server computer 200. Alternatively, the audio data is downloaded as required or in batches, as required by the application. Cache 240 also typically includes audio data to be uploaded to server 200, as will be described below. The memory for cache 240 may be random access memory, virtual memory, disk-based memory, and the like.

In the present embodiment, cache 240 typically stores only audio data. In alternative embodiments of the present invention, cache 240 may store audio and video data, and the like. Further, client software 250 and 260 may also be embodied to play and record audio and video data, and the like.

In the present embodiment, client software 250 typically provides the user with navigational tools to play-back audio data from cache 240 from within the web browser environment. For example, playing back spoken messages, playing back portions of messages, reviewing saved or previous messages, and the like. Client software 250 also typically provides the user with tools for recording, reviewing and editing of spoken messages. As will be described further below, the user may record messages, may record pronunciation exercises, may record grammar exercises, and the like.

Client software 260, typically a web browser plug-in application, in this embodiment, provides for the outputting of audio messages from cache 240 to audio drivers 270. Further, client software 260 also receives audio messages from audio drivers 270 and stores the audio messages into cache 240. In this embodiment, HTTP client software 280 outputs data in the manner specified by an HTTP server, for example, text, audio, layout, and the like. Client software 250 and 260 are embodied as an AchronosJ applet and an AchronosJ plug-in program, respectively, provided by Minds and Technology, Inc., the current assignee of the present application.

In FIG. 3, server computer 200 may be embodied as described above in FIG. 2, and may include other server specific components. For example, in this example, server computer 200 logically includes a database 290, an HTTP server 300, a server software 310, and the like.

In this example, database 290 may be any conventional database application from Oracle, Corporation, or the like. Further, HTTP server 300 may be any well known web server based upon LINUX, Solaris7 (Sun Microsystems), Windows NTJ, or the like. Server software 310 is provided in this embodiment, to handle the passing of data between database 290 and client software 250 and 260. Server software 310 is written by Minds and Technologies, Inc., the current assignee of the present application.

Figure 4:
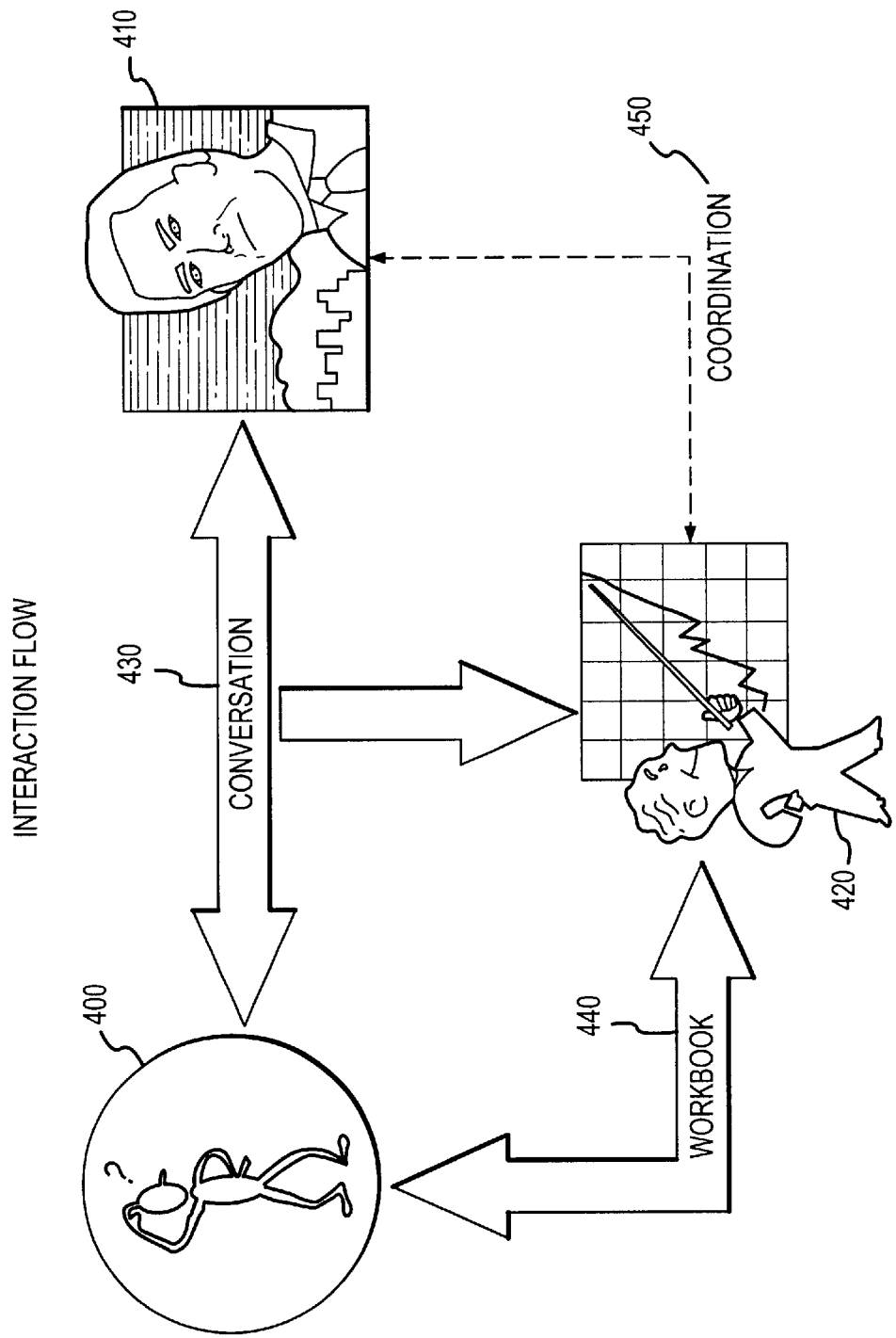
FIG. 4 illustrates interactions according to the one embodiment of the present invention.

FIG. 4 illustrates a diagram according to the present invention. In particular, FIG. 4 illustrates a conceptual block diagram of interaction between users. FIG. 4 illustrates three types of users: a learner 400, a conversation partner 410 (a speaking partner), and a teacher 420.

In the present embodiment, learner 400 is a person seeking to become more fluent in speaking a particular human language, such as English, Chinese, Russian, and the like. For example, the learner could be a native from Japan desiring to speak English more fluently and more like native English speakers. As another example, the learner could be a person seeking to improve her native language speaking skills. Skills and fluency may include pronunciation, grammar, inflection, use of idioms and slang, tone, and the like. Other types of general training may include speech making, customer service skills, counseling skills, and the like.

Conversation partner 410 is typically a native speaker of the language. As will be described below, conversation partner 410 engages in conversations with learner 400. In particular, conversation partner 410 records and exchanges audio messages to and from learner 400.

In the current embodiment, teacher 420 is typically a skilled instructor im the particular language. It is contemplated that teacher 420 is prequalified to participate in the embodiment of the present invention.

In operation, learner 400 and conversation partner 410 exchange a series of messages between each other, as indicated by conversation 430. As will be described further below, the messages are passed asynchronously between learner 400 and speaking partner. The asynchronous nature of these conversations allows learner 400 to practice speaking a message, before delivering it to the conversation partner, among other features.

The message recorded by learner 400 is sent to conversation partner 410 and also to teacher 420. In response, to the message, teacher 420 can critique the speech of the learner 400, and provide feedback to learner 400. In the present embodiment, the feedback is termed a workbook 440. Workbook 440 may include a series of tips or advice on correct or proper language usage, pronunciation, and the like; exercises for learner 400 to practice her newly learned skills; hints for learner 400 for self-assessment and self-critique; and the like. Further, workbook 440 may include graded exercises. Further examples of such feedback is described below.

FIG. 4 also includes a coordination loop 450 between conversation partner 410 and teacher 420. In one embodiment of the present invention, coordination loop 450 allows teacher 420 to instruct conversation partner 410 as to particular areas of speech learner 400 should work on. For example, if teacher 420 determines that learner 400 needs more practice with past verb tenses, teacher 420 may prompt conversation partner 410 to ask learner 400 questions about things that happened yesterday, or the like.

Figure 5A:
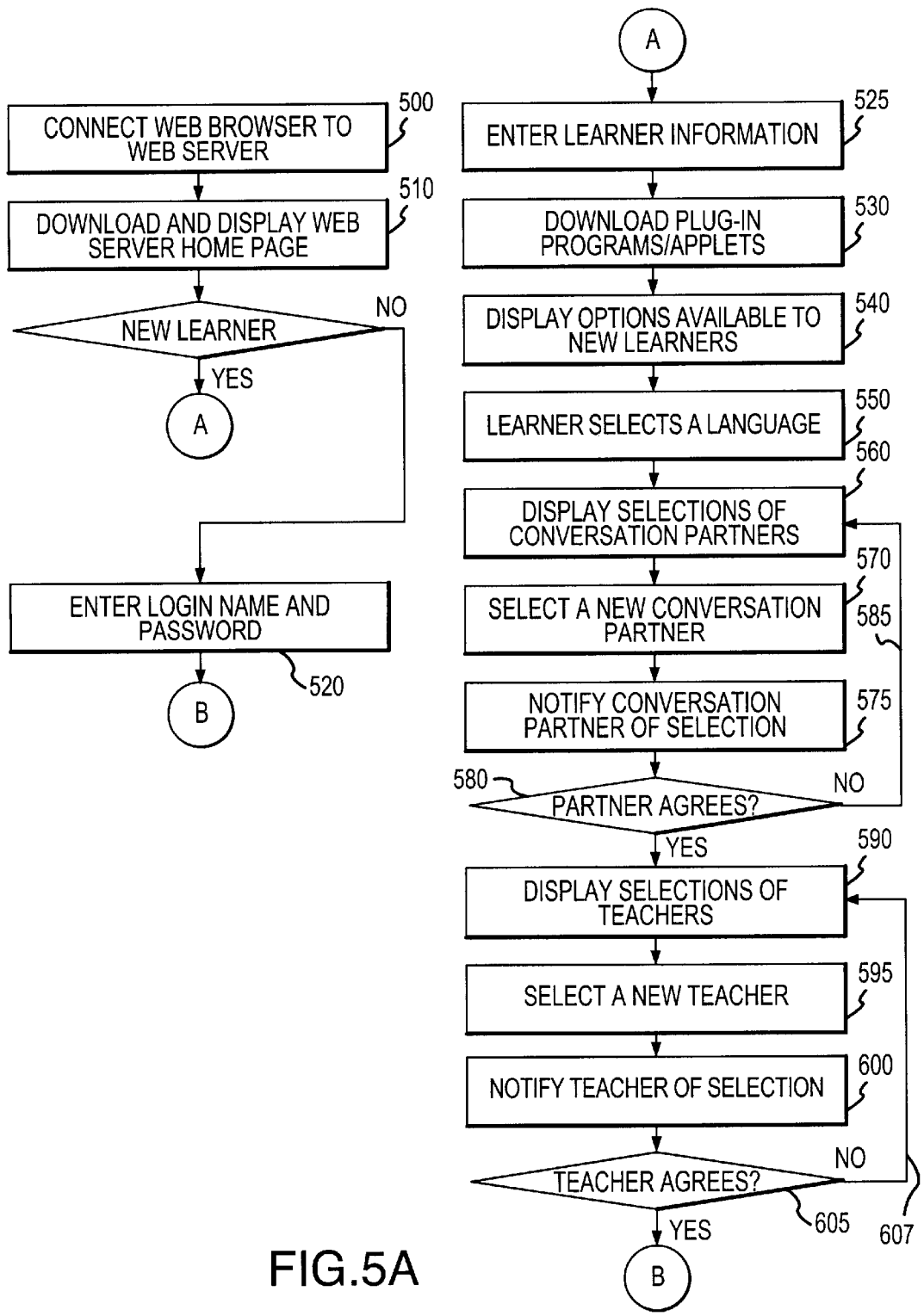
FIGS. 5A–C illustrate a flow diagram according to an embodiment of the present invention.
Figure 5B:
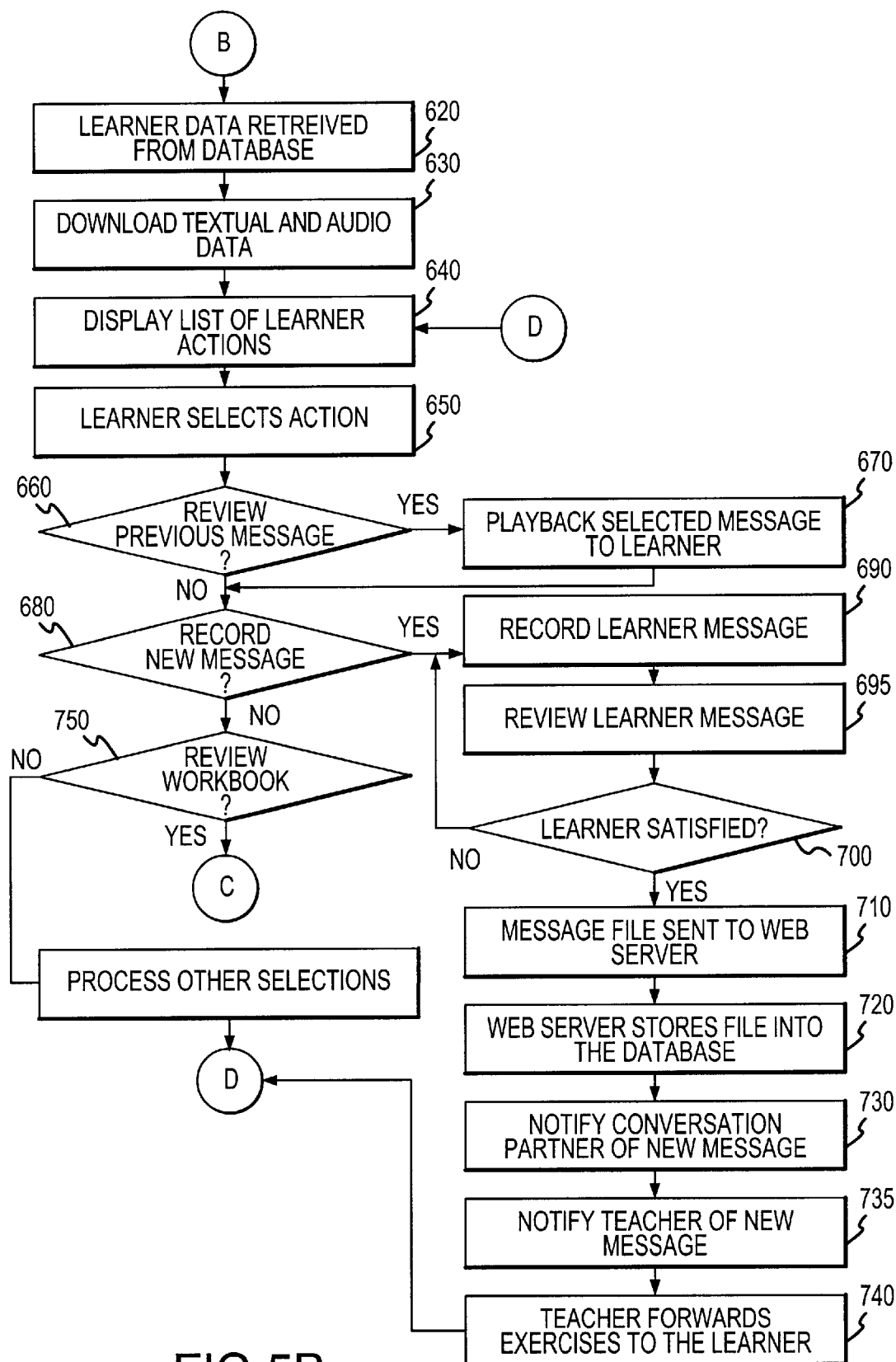
Figure 5C:
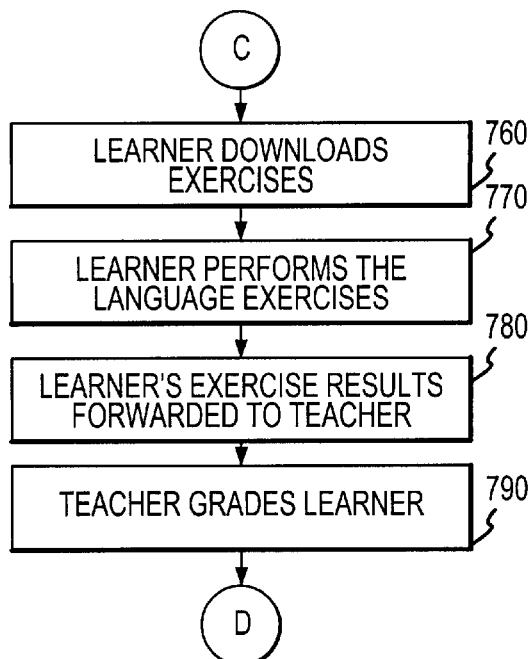

FIGS. 5A–5C illustrate a flow diagram according to an embodiment of the present invention. FIGS. 5A–5C are described using reference numerals found in FIG. 3. Initially, the user's (learner's) computer (client computer 220) is coupled to server computer 200 via computer network 210 and implements embodiments of the present invention, step 500. In the present example, server computer 200 is provided by Minds and Technology, the present assignee of this patent application. The web address of an embodiment of the present invention is www.sophopia.com, however, is not yet currently available to the public. In response, HTTP server 300 retrieves the home page of the web site and provides the page to the HTTP client software 280 on client computer 220. The home page then displayed on the users computer (client computer 220), step 510. The home page typically has a number of actions the learner can perform, such as obtaining information regarding the services provided, opportunities available, logging in, and the like.

If the learner already has an account, the learner typically types in a user name and a password, step 520. In the present embodiment, to register, the data entered by the learner is gathered by HTTP client software 280 and sent to HTTP server 300 via computer network 210, step 525. Data may include a name, address, hobbies, interests, goals, language in which fluency is desired, payment information, and the like.

Next, typically if the learner is new, the HTTP server 300 along with server software 310 provides client software 250 and 260, described above, for downloading and/or invoking on to the learner's computer (client computer 220), step 530. Operation of client software 250 and 260 is described further below.

In the present embodiment, after registering, the learner is typically presented with a web page listing the languages available for fluency training, step 540. This page is provided by HTTP server 300 and handled by HTTP client software 280, as described above. In response, the learner typically graphically selects a language that she desires to be more fluent in, step 550. This selection is sent back to HTTP server 300, as described above, and stored with the learner information in database 290.

In response to the learner language selection, database 290 typically returns a list of conversation partners available in the selected language, step 560. In this embodiment, this list of conversation partners is provided to the learner in the form of another web page. In one embodiment of the present invention, the list may include data such as the name of the conversation partner, biographic data, a list of personal interests, and the like. In other embodiments, other data may also include a rating of the conversation partner by other learners, availability, personal contact information, photograph, pre-recorded audio/video self-introduction, and the like.

The learner typically reviews the list of conversation partners including the additional data and selects one or several conversation partner, step 570. This selection is sent back to HTTP server 300, as described above, and is stored with the learner information in database 290.

In the present embodiment, conversation partners are typically native speakers in the selected language. In alternative embodiments, conversation partners may simply be fluent in the selected language, but not necessarily a native in the selected language. For example, a conversation partner for a Japanese native seeking to become fluent in English may be another Japanese native, who has lived in the United States for a long period of time (e.g. 10 to 20 years).

In this embodiment, conversation partners are typically pre-qualified before being placed on the list of conversation partners. In the present example, Minds and Technology may review a resume or equivalent of a potential conversation partner, before placing her name on the conversation partner list. In alternative embodiments, an operator of the web site may have different conversation partner qualification criteria. Typical criteria for conversation partners in a native language may include speaking ability, education level, grammar usage, and the like. In some embodiments of the present invention, conversation partners may be tested or interviewed, and compensated for their services. In other embodiments, conversation partners can be friends or associates of this learner, or even any native speaker.

The conversation partner selected by the learner is typically notified of her selection via electronic mail (e-mail), step 575. In alternative embodiments, the selected conversation partner is notified of her selection after she has logged into server computer 200, or the like. If the conversation partner does not agree to provide such services, step 580, next time the learner logs into server computer, the learner is prompted for a new conversation partner, step 585.

In response to the learner language selection, database 290 also typically returns a list of teachers available in the selected language, step 590. In this embodiment, the list of teachers is provided to the learner in the form of another web page. In one embodiment of the present invention, the list may include data such as the name of the teacher, biographic data, education level, teaching credentials, and the like. In other embodiments, other data may also include a rating of the teacher by other learners, availability, personal contact information, and the like.

In the present embodiment, it is envisioned that the list of teachers for any particular language will be very large, because geographic limitations discussed in the background of the invention are eliminated. In another embodiment, the teacher is assigned automatically on a first available basis, or the like.

The learner typically reviews the list of teachers including the additional data and typically selects one teacher, step 595. This selection is sent back to HTTP server 300, as described above, and stored with the learner information in database 290.

In the present embodiment, similar to conversation partners, teachers are typically native speakers in the selected language. In alternative embodiments, teachers may be educated in the selected language, but not be necessarily a native in the selected language.

In this embodiment, teachers are pre-qualified before being placed on the list of teachers. In the present example, Minds and Technology may review a resume or equivalent of a potential teacher before placing her name on the teachers list. In alternative embodiments, an operator of the web site may have different teacher qualification criteria. Typical criteria for teachers may include speaking ability, education level, grammar usage, teaching experience, and the like. In some embodiments of the present invention, teachers may be interviewed, tested, and/or compensated for their services.

The selected teacher is also typically notified of her selection via e-mail, voice mail, or the like step 600. In alternative embodiments, the selected teacher is notified of her selection after she has logged into server computer 200. If the teacher does not agree to provide such services, step 605, the next time the learner logs into server computer, the learner is prompted for a new teacher selection, step 607.

When a conversation partner and a teacher have agreed to provide such services, typically the next step is for the conversation partner to submit a message to the learner. In the present embodiment, the message is in the form of a spoken message in the selected language. In alternative embodiments, the message may also include a video images, static images, textual data, file attachments, and the like. The message for the learner is typically stored in database 290. Further detail regarding actions taken by a conversation partner are discussed in FIG. 6, below.

Because the actions of the conversation partner and the learner are asynchronous in nature, the learner need not be online at the same time as the conversation partner or the teacher.

In step 620, after logging in, data related to the learner is retrieved from database 290. In particular, server software 310 may access database 290 to retrieve data associated with the learner. Such data may include lists of on-going conversations, new and old messages from conversation partners and teachers; messages recorded by the learner; exercises and other feedback from teachers, and the like. Not all data need be retrieved from the database at the same time. In one embodiment, a textual history of when messages have been sent back and forth between the learner and a conversation partner is retrieved. Further, a file, or multiple files that include the audio messages that have been sent between the learner and conversation partner and/or teacher is also retrieved.

In the present embodiment, the textual history and the file or multiple files are then downloaded to the learner's computer, step 630. The textual history may include the date of when conversations occur, topic, and the like, further the history is typically displayed to the learner via client software 280. Further, the file or multiple files including audio messages are typically stored in cache 240 in the learners computer.

In the present embodiment, client software 280 typically lists actions available to the learner, for example, to review previous messages sent and received to and from a conversation partner, to record a new message, and the like, step 640. The learner typically selects an action via clicking upon an icon, or the like on the display, 650. In response, an action associated with the icon may be performed.

In one case, when the learner wishes to review previous audio messages, step 660, the learner typically clicks upon a particular text phrase, icon or the like on the display. In response, client software 250 and 260 are activated to retrieve appropriate is audio data that was downloaded and stored in cache 240 for playback via audio drivers 270, step 670. In alternative embodiments, image data, video data, and the like may also be reviewed and output to the learner.

In another case, when the learner wishes to record a new audio message, step 680, the learner typically clicks upon a particular text phrase, icon or the like on the display. In response, client software 250 and 260 are activated to store audio data received from audio drivers 270 into cache 240, step 690. The learner may speak into a microphone coupled to client computer 220 to enter the speech data. In other embodiments of the present invention, the learner may also record video images, attach files, and the like for the conversation partner, or the teacher.

After the learner has finished recording the message, she may review the message, step 695. When the learner is satisfied with the message, step 700, a file is sent to server computer 200 that includes the recorded message, step 710. By allowing the learner to relax and record and re-record her message, it is believed that the learner will achieve a higher comfort level in speaking the language, as well as a higher degree of fluency in the language. Further, by allowing the learner to record, listen, and re-record her message asynchronously from the conversation partner and teacher, it is possible to economize on labor costs. In the present embodiment, client software 250 and 260 are typically used to send the appropriate audio data as a file to server software 310.

Next, server software 310 typically receives the audio file and stores the file into database 290, step 720. Server software 310 also typically notifies the conversation partner, step 730, and the teacher, step 735, that a new message has been received. In one embodiment of the present invention, the conversation partner may be notified by e-mail, voice mail, or the like. Alternatively, the conversation partner may see a notice of a new message once she logs into the system. In the present embodiment, server software 310 also notifies a teacher, in possibly the same manner as above, that a new message has been received.

In response to the message from the learner, the teacher typically critiques the message and gives feedback to the learner, step 740. Further detail regarding actions taken by the teacher are discussed in FIG. 7, below.

In the present embodiment, feedback from the teacher may include a series of practice exercises. For example, using tools provided by client software 250 and 260, and others, the teacher may isolate snippets of the learner's speech from her message and include those snippets into exercises. Types of feedback may include notice of grammatical problems, pronunciation problems, or the like.

Using tools provided by client software 250 and 260, the learner typically reviews the teacher's feedback and practices the advice given by downloading exercises, step 760, and doing the exercises, step 770. Continuing the example immediately above, the learner plays snippets identified by the teacher to hear herself speak, and in response attempts to say the snippet in the correct way, an alternative way, or the like. A more complete list of options available to the learner are found in the attached appendix.

The learner's attempts in these exercises may be sent back to the teacher in step 780. In response to the learner's attempts, the teacher may grade the learner and/or give further advice and feedback, step 790.

Figure 6A:
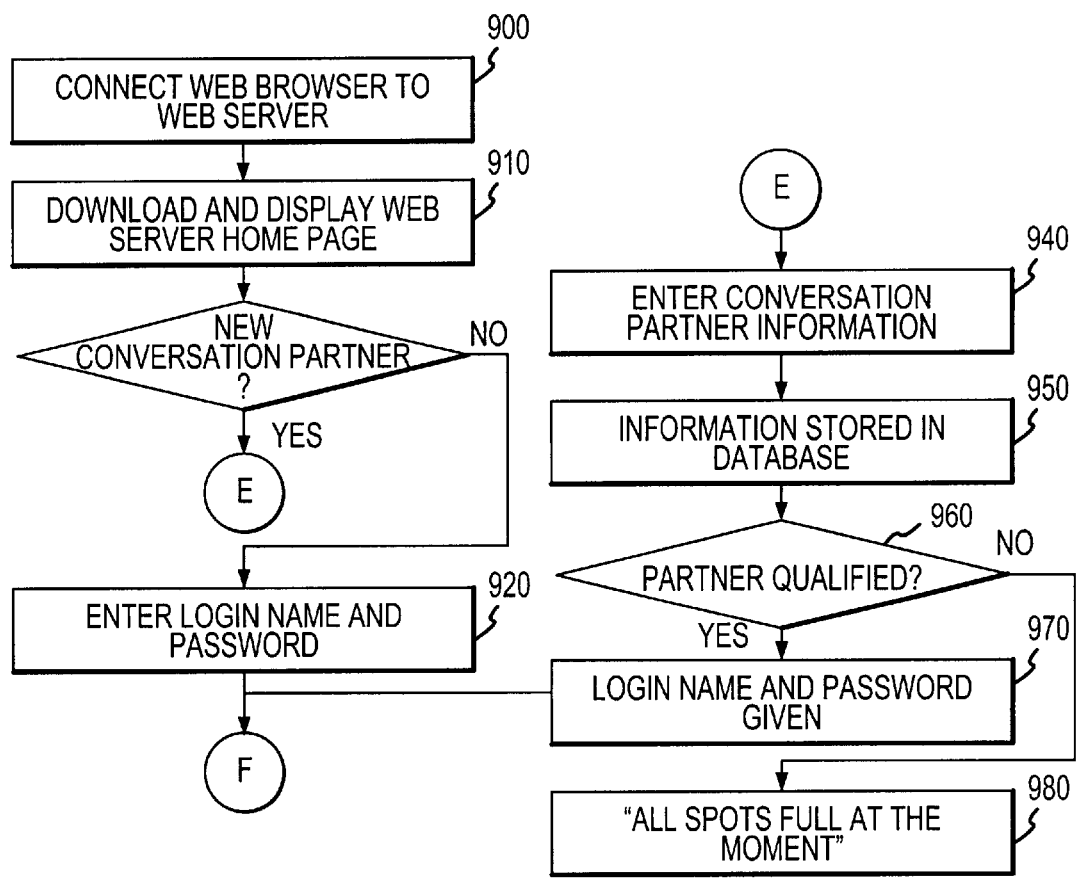
FIGS. 6A and 6B illustrate a flow diagram according to an embodiment of the present invention.
Figure 6B:
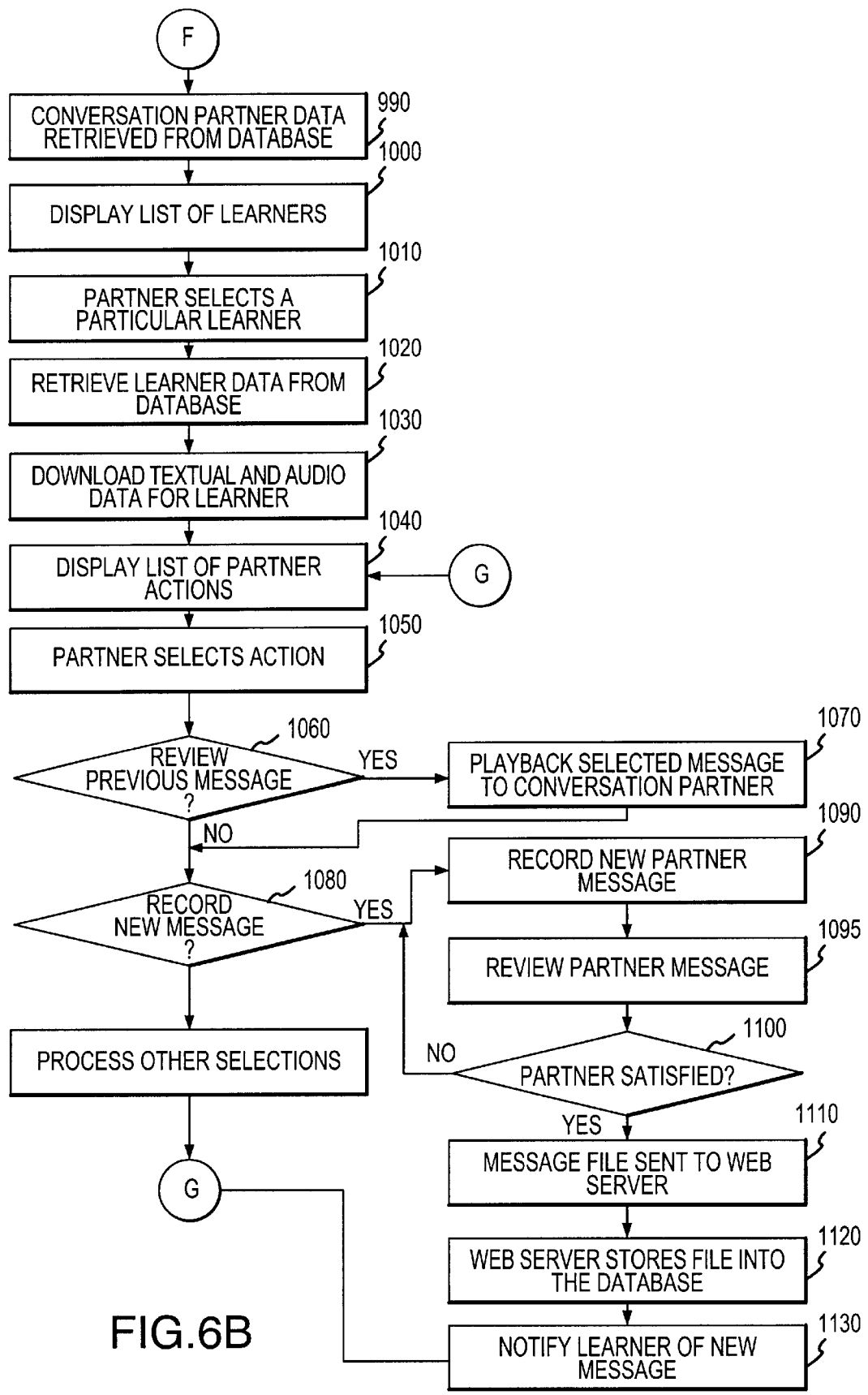

FIG. 6 illustrates a flow diagram according to an embodiment of the present invention. In particular, FIG. 6 illustrates actions performed by the conversation partner. In the present embodiment, the conversation partner's computer may be configured as illustrated in FIG. 3.

Initially, the conversation partner's computer (client computer 220) is coupled to server computer 200 via computer network 210 implementing embodiments of the present invention, step 900. In the present example, server computer 200 is also provided by Minds and Technology, the present assignee of this patent application. The web address of an embodiment of the present invention is www.sophopia.com. In response, HTTP server 300 retrieves the home page of the web site and provides the page to the HTTP client software 280 on client computer 220. The home page is then displayed on the conversation partner's computer, step 910. The home page typically has a number of actions the conversation partner can perform, such as obtaining information regarding the services provided, providing a list of learners looking for a conversation partner, logging in as a conversation partner, and the like.

The home page typically prompts conversation partners who are already qualified for a user name and a password. If the conversation partner has already been qualified, the conversation partner typically types in a user name and a password, step 920. In the present embodiment, the data entered by the conversation partner is gathered by HTTP client software 280 and sent to HTTP server 300 via computer network 210.

The home page also typically prompts potential conversation partners to submit applications to become conversation partners. In one embodiment, the types of data requested for potential conversation partners may include demographic data, educational background, language experience, and the like. In response to the prompts, the potential conversation partner enters the requested data, step 940. Further, telephonic and/or face to face interviews may be required. In the present embodiment, the data entered by the potential conversation partner is gathered by HTTP client software 280 and sent to HTTP server 300 via computer network 210, step 950.

If the potential conversation partner is qualified, step 960, the person is typically given a login name and a password, step 970. If the person is not qualified, the person is typically sent a polite rejection note, step 980. In the present embodiment, the potential conversation partner is typically notified by e-mail, telephone, or the like. In an alternative embodiment, the qualification process may occur in real-time, e.g. while waiting. When the person is qualified, steps 900–940 may be repeated.

In step 990, after the conversation partner has logged in, data related to the conversation partner is retrieved from database 290. In particular, server software 310 may access database 290 to retrieve data associated with the conversation partner. Such data may include lists of on-going conversations, new and old messages from learners, messages recorded by the conversation partner, and the like. Not all data need be retrieved from the database at the same time. In one embodiment, only a list of current learners is first sent to the conversation partner, step 1000.

In response to the list of learners, the conversation partner may select a particular learner via graphical user interface. This selection is then sent to server computer 200, step 1010. In response to the selection, server computer 200 typically retrieves "learner data" related to the learner and the conversation partner from database 290, step 1020.

The learner data typically includes a textual history of when messages have been sent back and forth between the learner and the conversation partner. Further, the learner data typically includes a file, or multiple files that include the audio messages that have been sent between the learner and conversation partner. In the present embodiment, the textual history and the file or multiple files are downloaded to the conversation partner's computer, step 1030. The textual history is typically displayed to the conversation partner via client software 280. Further, the file or multiple files including audio messages are typically stored in cache 240.

In the present embodiment, client software 280 typically then lists actions available to the conversation partner, for example, to review previous messages, to record a new message, and the like, step 1040. The conversation partner typically selects an action via clicking upon an icon, or the like on the display, 1050. In response, an action associated with the icon may be performed.

In one case, when the conversation partner wishes to review previous audio messages, step 1060, the conversation partner may click upon a particular text phrase, icon or the like representing the message of interest. In response, client software 250 and 260 are activated to retrieve appropriate audio data from cache 240 for playback via audio drivers 270, step 1070. In alternative embodiments, image data, video data, and the like may also be reviewed.

In one case, when the conversation partner wishes to record a new audio message, step 1080, the conversation partner may click upon a particular text phrase, icon or the like, representing that function. In response, client software 250 and 260 are activated to store audio data received from audio drivers 270 into cache 240, step 1090. For example, the conversation partner may speak into a microphone to enter audio data. In other embodiments, the conversation partner may also record video images, attach files, and the like.

In the present embodiment, after the conversation partner has finished recording the message, she may review the recorded message, step 1095. If the conversation partner is satisfied with the message, step 1100, she may send a file or other data mechanism (data stream), to server computer 200 that includes the recorded message, step 1110. Otherwise, the conversation partner may re-record the message. In the present embodiment, client software 250 and 260 are activated send the appropriate audio data as a file to server software 310.

The server software 310 typically receives the file and stores the file into database 290, step 1120. Further, server software 310 typically notifies the learner that a new message has been received, step 1130. In one embodiment of the present invention, the learner may be notified by e-mail, voice mail, or the like. Alternatively, the learner may see a notice of a new message once she logs into the system.

In light of the present disclosure, many other actions are available to the conversation partner and are contemplated in alternative embodiments of the present invention. For example, the conversation partner may receive text messages, audio messages, and the like not only form learners, but also teachers, other conversation partners, and the like. As illustrated in FIG. 4, in one example, teachers and conversation partners may coordinate their actions and messages to provide an enhanced learning environment for the learner. Similarly, the conversation partner may record messages in various form for different teachers, conversation partners, and the like. A more complete list of options available to the conversation partner are found in the attached appendix.

Figure 7A:
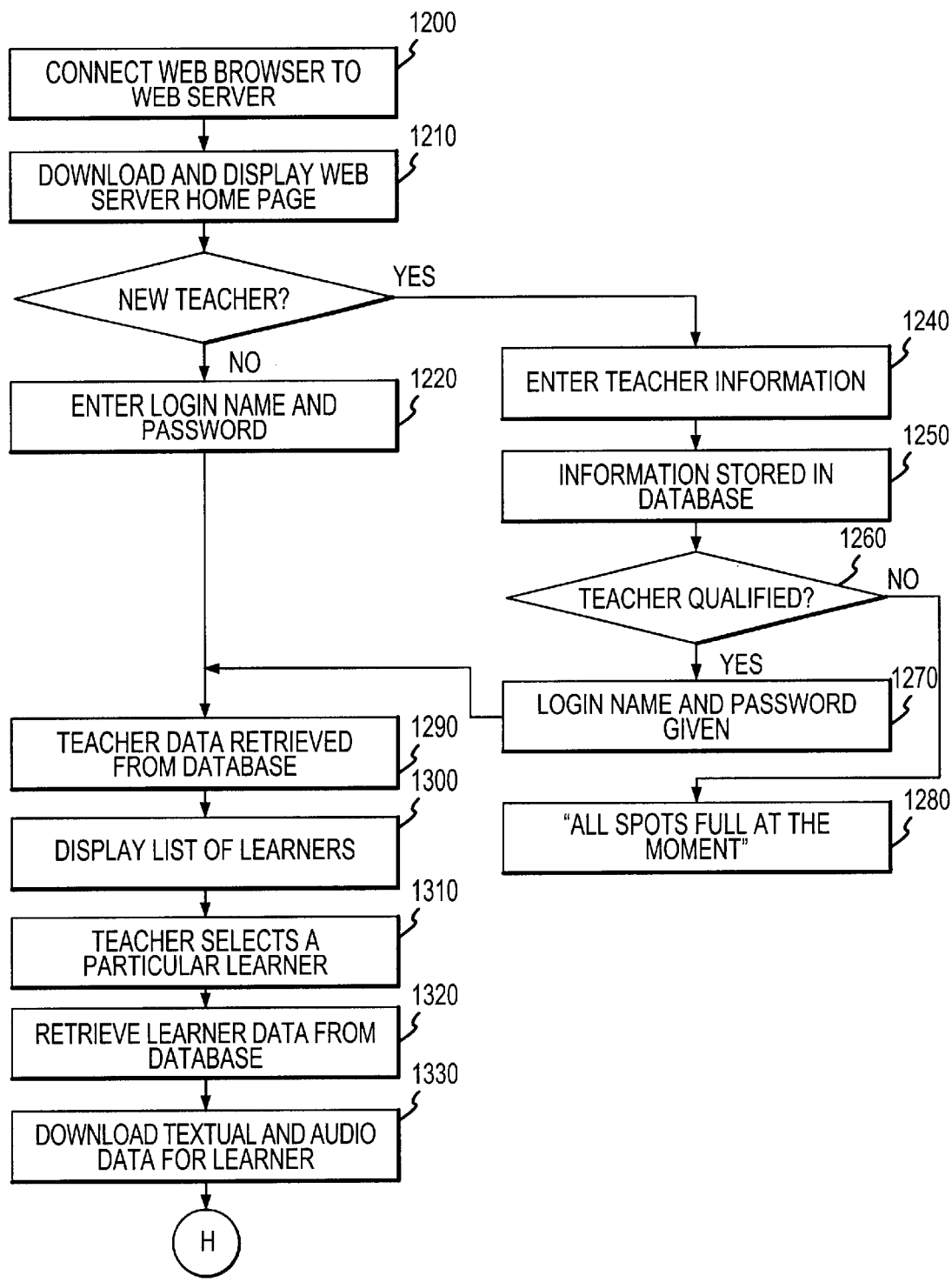
FIGS. 7A and 7B illustrate a flow diagram according to an embodiment of the present invention.

FIG. 7 illustrates a flow diagram according to an embodiment of the present invention. In particular, FIG. 7 illustrates actions performed by the teacher. In the present embodiment, the teacher's computer may also be configured as illustrated in FIG. 3.

As above, initially, the teacher's computer is coupled to server computer 200 via computer network 210 implementing embodiments of the present invention, step 1200. In response, HTTP server 300 retrieves the home page of the web site and provides the page to the HTTP client software 280 on the teacher's computer 220. The home page is then displayed on the teacher's computer, step 1210. The home page typically has a number of actions the teacher can perform, such as obtaining information regarding the services provided, providing a list of learners looking for teachers, logging in as a teacher, and the like.

The home page typically prompts teachers who are already qualified for a user name and a password. If the teacher has already been qualified, the teacher typically types in a user name and a password, step 1220. Typically, as described above, the data entered by the teacher is gathered by HTTP client software 280 and sent to HTTP server 300 via computer network 210.

The home page also typically prompts potential teachers to submit applications to become teachers. In one embodiment, the types of data requested for potential teachers may include demographic data, educational background, language training experience, and the like. In response to the prompts, the potential teacher may enter the requested data, step 1240. Again, the data entered by the potential teacher is gathered by HTTP client software 280 and sent to HTTP server 300 via computer network 210, step 1250. In addition to the above, telephonic or face to face interviews with the potential teacher may be performed, references of the teachers may be checked, tests may be given, and the like.

If the teacher is qualified, step 1260, the person is typically given a login name and a password, step 1270. Further, the teacher is typically given technical as well as other training as needed. If the person is not qualified, the person is typically sent a polite note, step 1280. In the present embodiment, the potential teacher is typically notified by e-mail, telephone, or the like. In an alternative embodiment, the qualification process may occur in real-time, e.g. within five or ten minutes. When the person is qualified, steps 1200–1240 may be repeated.

In step 1290, after the teacher has logged into the system, data related to the teacher is typically retrieved from database 290. For example, server software 310 accesses database 290 to retrieve data associated with the teacher. Such data typically includes lists of on-going conversations between learners and conversation partners, new and old messages from learners and/or conversations partners, messages recorded by the teachers, and the like. Other data includes exercises assigned by the teacher, responses to exercises, performance evaluations, and the like. Not all data need be retrieved from the database at the same time. In one embodiment, only a list of current learners is first sent to the teacher, step 1300.

In response to the list of learners, the teacher typically selects one learner via graphical user interface. This selection is then sent to server computer 200, step 13 10. In response to the selection, server computer 200 typically retrieves "learner data" related to the learner and to the teacher from database 290, step 1320.

The learner data typically includes a textual history of when messages have been sent back and forth among the learner, the conversation partner, and the teacher, exercises assigned to the learner, the learner's responses to exercises, evaluations of the learner's performance, and the like. Further, the learner data typically includes a file, or multiple files that include the audio messages that have been sent between the learner and conversation partner. In the present embodiment, the textual history and the file or multiple files are downloaded to the teacher's computer, step 1330. The textual history is typically displayed to the teacher via client software 280. Further, the file or multiple files including audio messages are typically stored in cache 240.

In the present embodiment, client software 280 typically lists actions available to the teacher, for example, to review previous messages among the parties, to record a new message, to create exercises for the learner, to grade learner's performance of exercises, and the like, step 1340. The teacher typically selects an action via clicking upon an icon, or the like on the display, step 1350. In response, an action associated with the icon may be performed.

Figure 7B:
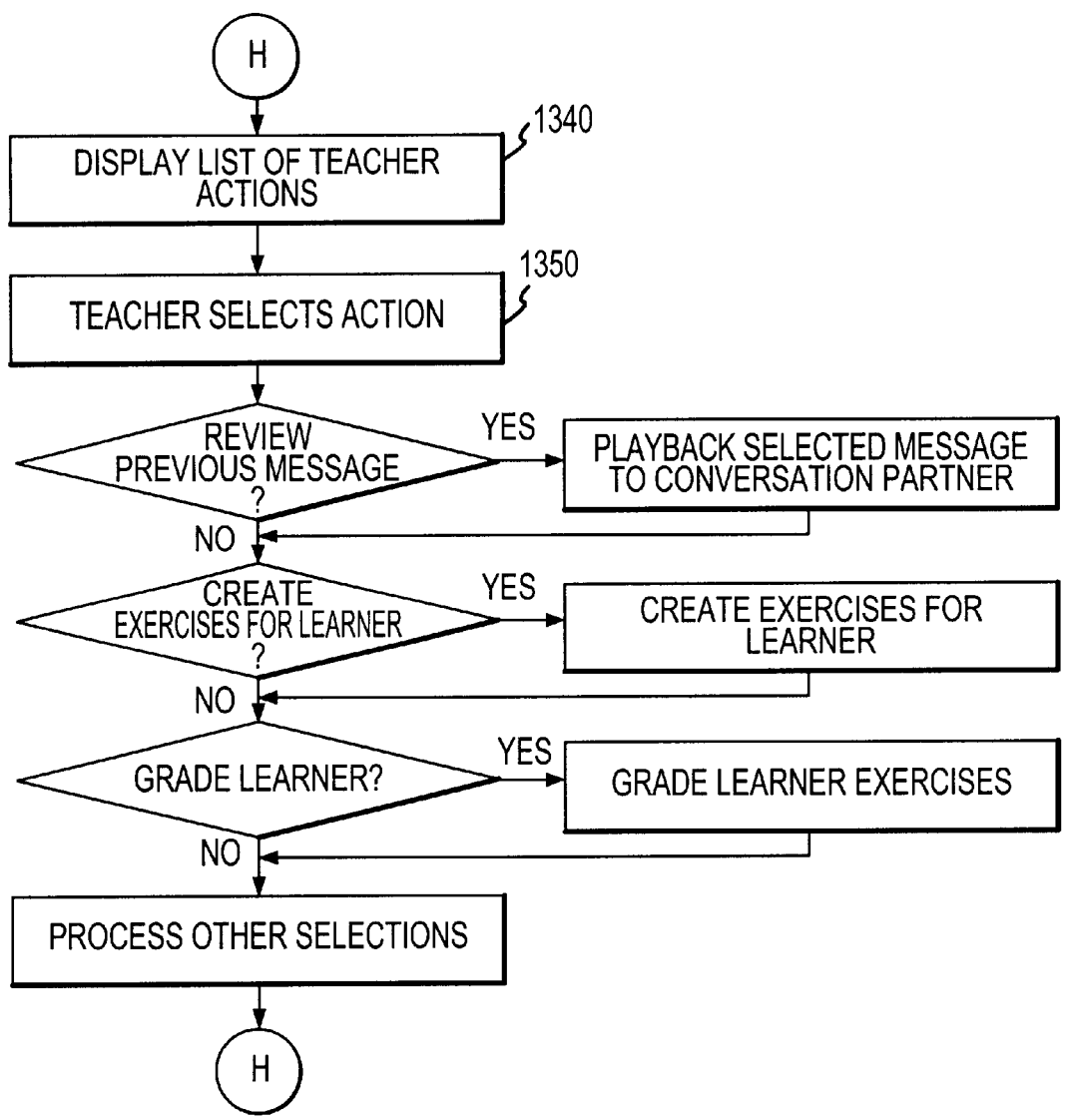

As illustrated in FIG. 7B and above for the conversation partner, the teacher may review conversations between the learner and the conversation partner, may create exercises for the learner, may grade the learners performance, may record messages for either party, and the like. A more complete list of options available to the teacher are found in the attached appendix.

Figure 8:
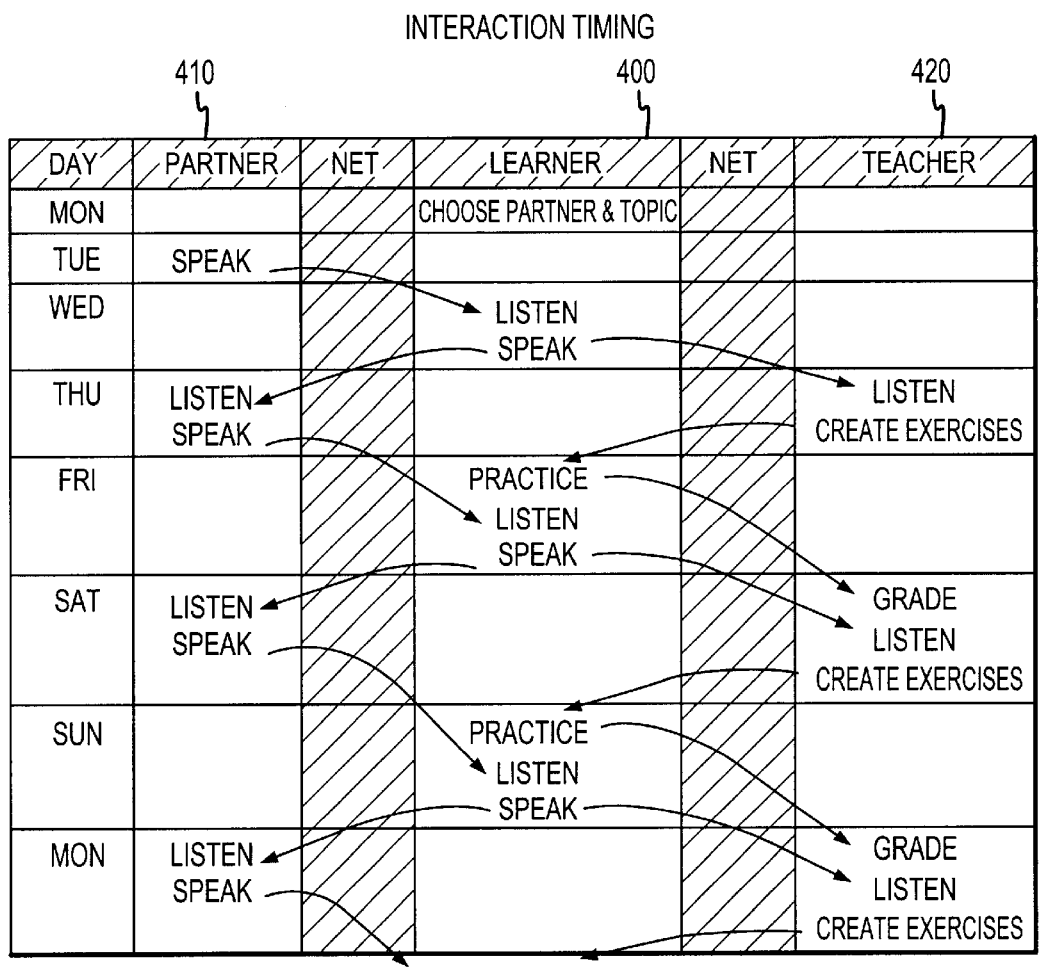
FIG. 8 illustrates a flow diagram according to an embodiment of the present invention.

FIG. 8 illustrates a flow diagram according to an embodiment of the present invention. In particular, FIG. 8 illustrates the asynchronous nature of the conversations and workbooks discussed in FIG. 4, above.

In this example, on the first Monday, learner selects conversation (or speaking) partner 410 and topic for discussion. On Tuesday, the chosen conversation partner 410 leaves a message for learner 400 about the topic. On Wednesday, learner 400 listens to the spoken message from conversation partner 410 and generates a message in response. As mentioned above, because learner 400 can record and re-record a responsive message at her own leisure, learner 400 can practice responding to the message until she is satisfied with her performance without having to pass for conversation partner or teacher time as much as in synchronous interactions.

Next, the learner message is forwarded to both conversation partner 410 and teacher 420, as described above. On Thursday, conversation partner 410 listens to the learner's message and responds to the message with another message. Also on Thursday, teacher 420 listens to the learner's message and creates exercises based upon problems with the learner's message. The exercises, hints, and advice (together workbook) are then forwarded back to learner 400.

On Friday, learner 400 does the exercises given to her by teacher 420 in view of teacher's advice and other feedback. The exercise results are forwarded back to teacher 420 on Friday. Further, on Friday, learner 400 listens to the latest spoken message from conversation partner 410 and generates a new message in response. On Saturday, teacher 420 grades the exercise results from learner 400.

As can be seen, the rate at which conversation partner 410 and teacher 420 respond to learner 400 are mostly independent. For example, conversation partner 410 may respond to learner 410 in two days, whereas teacher 420 responds to learner 400 on the same day learner 400 posts a message. As another example, learner 400 and conversation partner 410 may send messages to each other once a day, whereas teacher 420 responds to a message from learner 400 two days after learner 400 had sent the message.

In other embodiments of the present invention, communication between conversation partner 410 and teacher 420 may also be provided, although not explicitly shown in FIG. 8.

Figure 9:
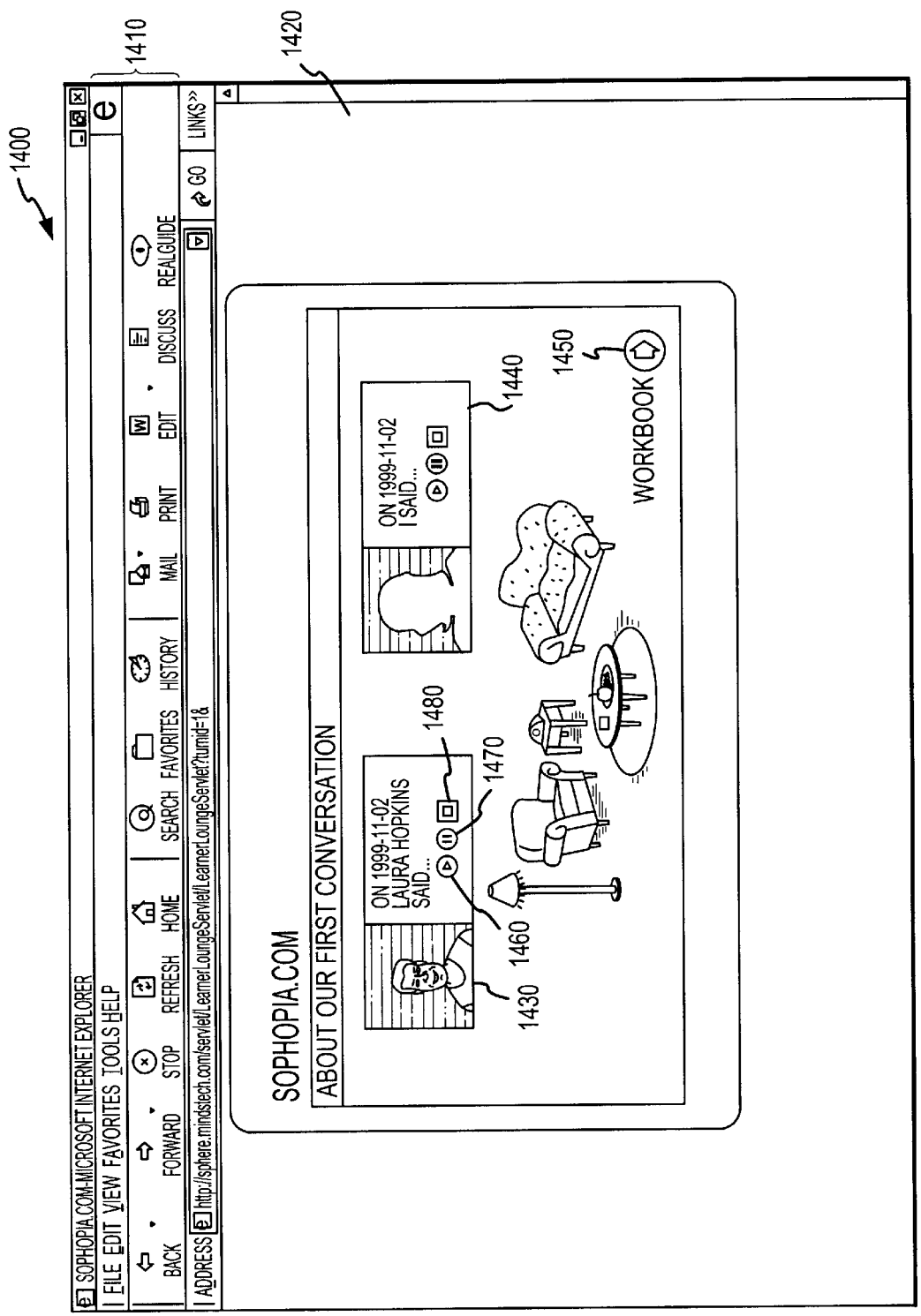
FIG. 9 illustrates a typical graphical user interface (GUI) according to an embodiment of the present invention.

FIG. 9 illustrates a typical graphical user interface (GUI) according to an embodiment of the present invention. FIG. 9 includes a typical web browser interface 1400 including navigation portions 1410 and a display portion 1420 presented to a learner or a conversation partner.

In this embodiment, display portion 1420 includes a typical GUI presented to a learner. The GUI includes a conversation partner portion 1430, a learner portion 1440, and a workbook icon 1450. As is illustrated, conversation partner portion 1430 and a learner portion 1440 include a series of icons 1460-1480.

In the present embodiment, when the user selects icon 1460, the spoken message by the respective person is played out from the computer. When the user selects icon 1470, the message playback pauses. Further, when the user selects icon 1480, the message playback stops. For example, if the user selects icon 1460 in learner portion 1440, the user will hear the audio message left by the learner.

When a learner selects workbook icon 1450, in this embodiment, the learner retrieves exercises, hints, and the like from the teacher, as is seen in the next two figures. In other embodiments, other types of functions may be made available via the GUI, for example, composing a textual message for a teacher, a conversation partner, a learner, and the like.

Figure 10:
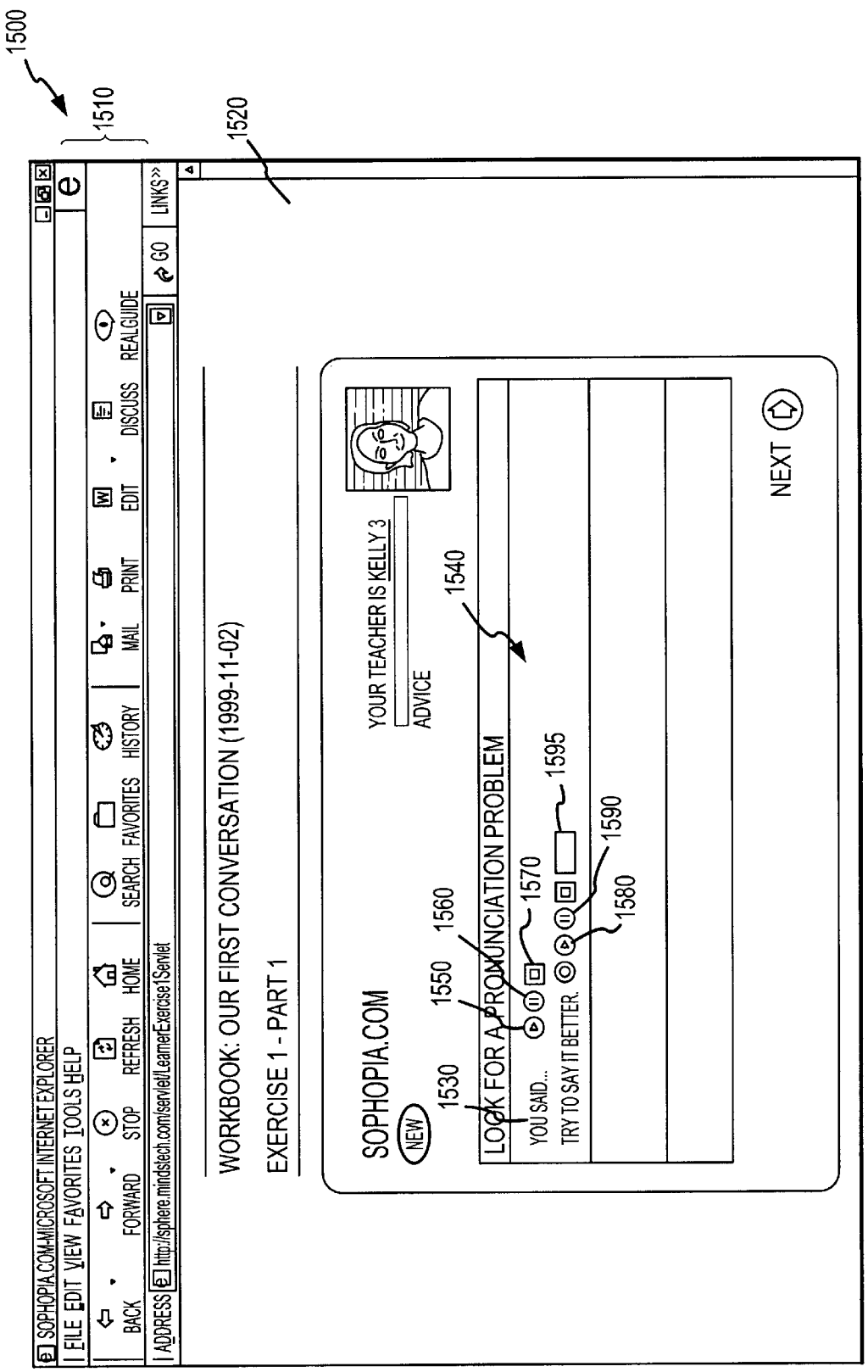
FIGS. 10 and 11 illustrate typical graphical user interfaces (GUIs) according to an embodiment of the present invention.
Figure 11:
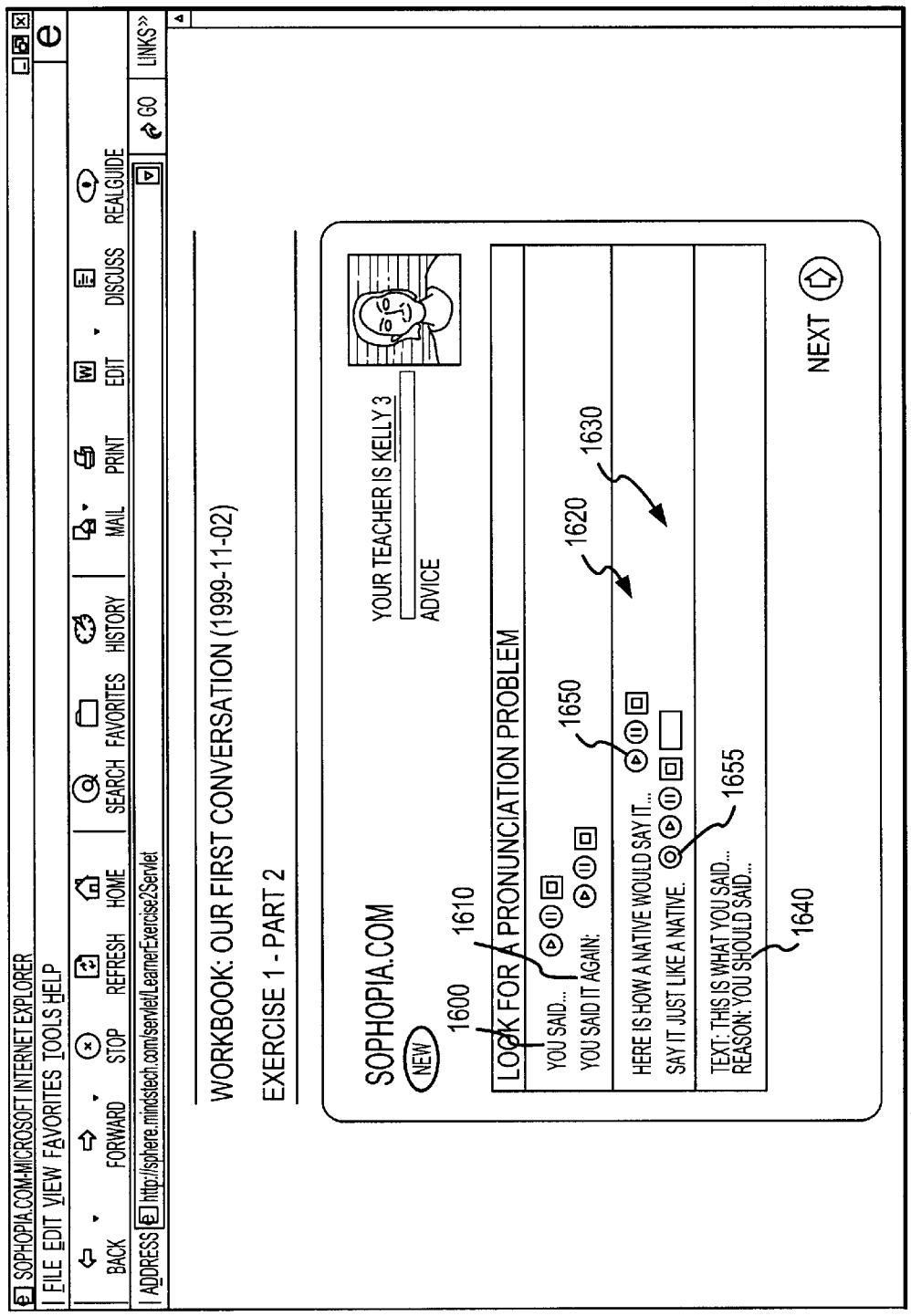

FIGS. 10 and 11 illustrate typical graphical user interfaces (GUIs) according to an embodiment of the present invention. FIGS. 10 and 11 include a typical web browser interface 1500 including navigation portions 1510 and a display portion 1520 presented to a learner. As illustrated in this example, display portion 1520 points out to the learner that the learner has made a pronunciation error in her message to the conversation partner.

In this embodiment, display portion 1520 includes a typical GUI presented to a learner. The GUI includes a snippet portion 1530 and an exercise portion 1540. As is illustrated, snippet portion 1530 includes a series of icons 1550-1570.

In the present embodiment, when the learner selects icon 1550, the snippet of spoken message by the learner is played out from the computer. As an example, if during the learner's message to her conversation partner she says "vege TA ble," the teacher may copy that portion of the message and store that message snippet. When icon 1550 is selected, that snippet is typically played back to the learner. When the user selects icon 1560, the playback pauses. Further, when the user selects icon 1570, the playback stops.

In the example, exercise portion includes icons 1580, 1590, and 1595. When the learner selects icon 1580, the learner can record her attempt to correct the problem pointed-out by the teacher. For example, in this case, the learner will attempt to pronounce the word "vegetable" differently. Next, by selecting icon 1590, the learner can play back her attempt to correct the problem. In one embodiment of the present invention, the learner is given a set number of attempts to correct the problem on her own until the correct solution is presented to the learner. It is believed that such self-analysis improves language fluency.

In the present embodiment, selection of icon 1595, the learners recorded speech is sent to the server. In other embodiments, other types of functions may be made available via the GUI, for example, composing a textual message for a teacher, a conversation partner, a learner, and the like.

In the example illustrated in FIG. 11, a GUI of the exercise solutions are presented to the learner after two tries as shown. In alternative embodiments, greater or lesser numbers of attempts or tries may be provided to the learner depending on specific application. In this example, the learner may be presented with portions 1600 and 1610 associated with the learner's attempts to correct the problem.

With this GI, the learner is also presented with a solution portion 1620. In this example, solution portion allows the learner to hear how a native speaker of the language would say the snippet, and the like. Continuing the example above, selection of play icon 1650, results in the playing of the word "VEGE ta ble."

This embodiment also includes a portion 1630 that allows the learner to record and listen to her attempts to repeat the "solution" to the problem. A learner clicks on icon 1655 to record her attempt. In the present embodiment, the learner's attempts in portions 1600 and 1610, as well as in 1630 are forwarded to the teacher for the teacher's analysis. In alternative embodiments, only the recording made in portion 1630 is sent to the teacher.

In one embodiment of the present invention, a text portion 1640 is provided to explain to the learner in more detail the nature of the problem in the learner's speech, and the like. Further, text portion 1640 may include a transcript of the snippet. For example, if the problem is related to verb tenses, the teacher may transcribe the words in the snippet, and explain in detail what is wrong and how to correct such errors.

In other embodiments, other types of functions may be made available via the GUI, for example, composing a text or spoken message for a teacher, a conversation partner, a learner, and the like. Further, fewer functions may also be offered to the learner in more compact embodiments of the present invention.

In the present embodiment, the following actions are performed by the teacher in response to the spoken message from the learner. Initially the teacher may listen to the entire recording produced by the learner. During this process, the user may note, via a mouse click, or the like, when the teacher notes a "mistake." This marking may be done in conjunction with a teacher graphical user interface illustrated below.

In this embodiment, when the teacher marks or notes a mistake, a segment of speech immediate preceding the mark is noted. The segment of speech may be of any length. In this embodiment, the segment of speech represents five seconds. The segments marked are further processed below.

After the teacher has reviewed the entire spoken message, the user may give an over all grade. Next, the teacher may select marked segments graphically. Upon selection of the marked segments, the speech corresponding to the mark is played back to the teacher. The beginning and ending points for each marked segments may be adjusted by the teacher to capture the entire problem speech. For example, the teacher may stretch the time from 5 seconds to 10 seconds, with 7 seconds preceeding the original mark, and 3 seconds following the original mark. In this embodiment, the defined segment is the "snippet" described in the embodiment above.

In the present embodiment, for each segment, the teacher categorizes the type of error in language production. Typical categories may include word choice, grammar, pronunciation, vocabulary, and the like. Next, the teacher records the speech in the segment the way the teacher would say it. The teacher may also include further text description of the problem, if desired.

Once the errors are marked and processed by the teacher, the teacher is finished. In one embodiment of the present invention, the teacher marks only a limited number of mistakes per learner message, for example, three. In other embodiments, the number of mistakes may be definable by the particular application, by the learner, or the like. The resulting exercise is then forwarded to the learner, for her practice, as described above.

The learner's results are returned to the teacher, who then may grade the learner's performance, or the like.

Figure 12:
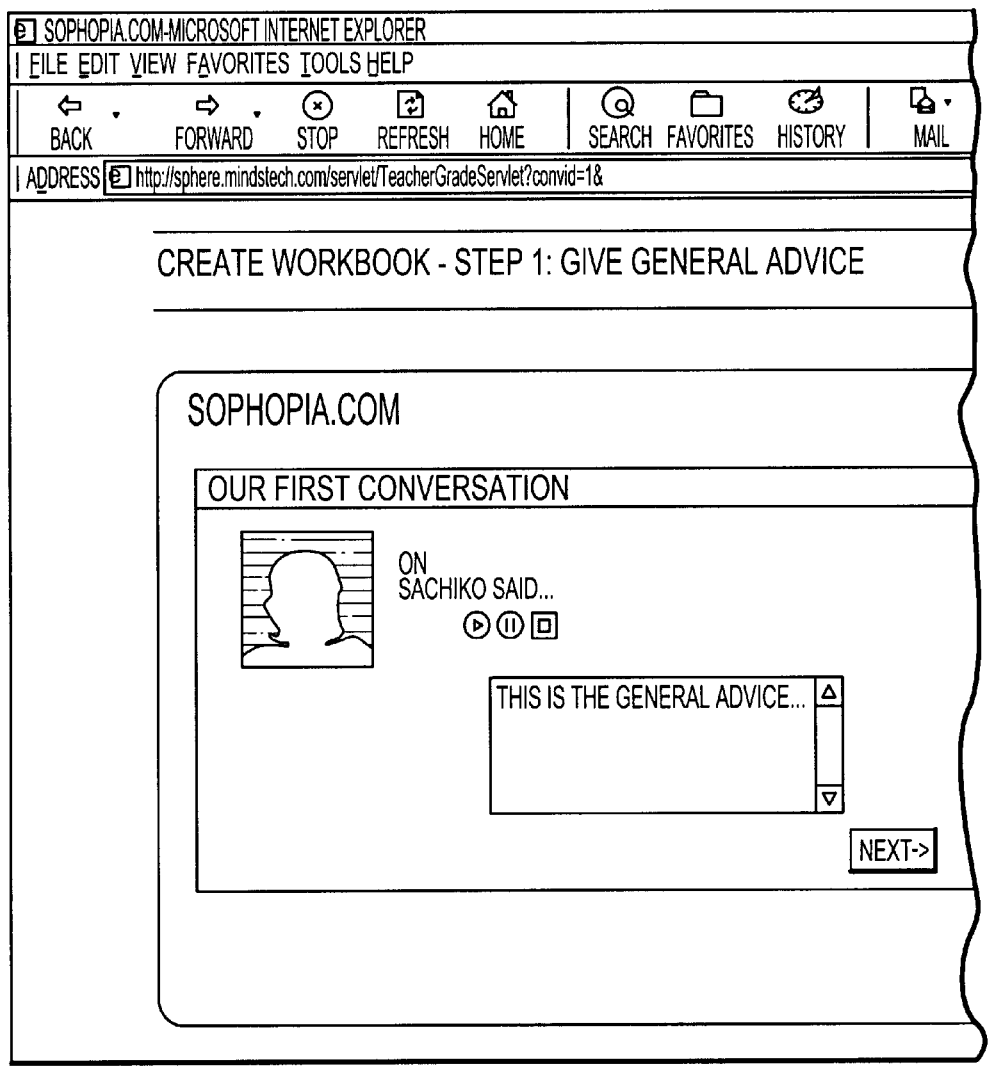
FIGS. 12–16 illustrate typical graphical user interfaces (GUIs) according to an embodiment of the present invention.
Figure 13:
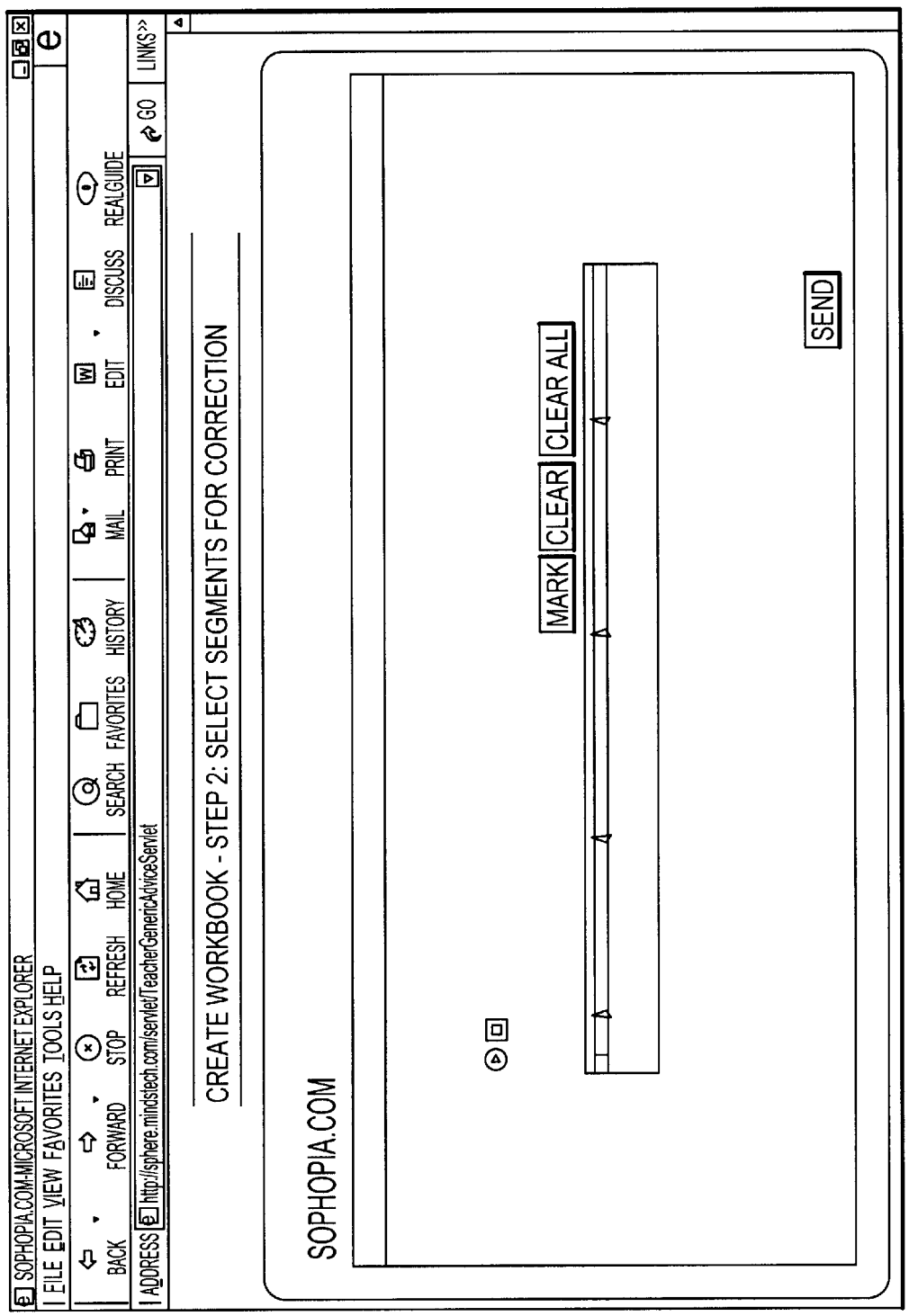
Figure 14:
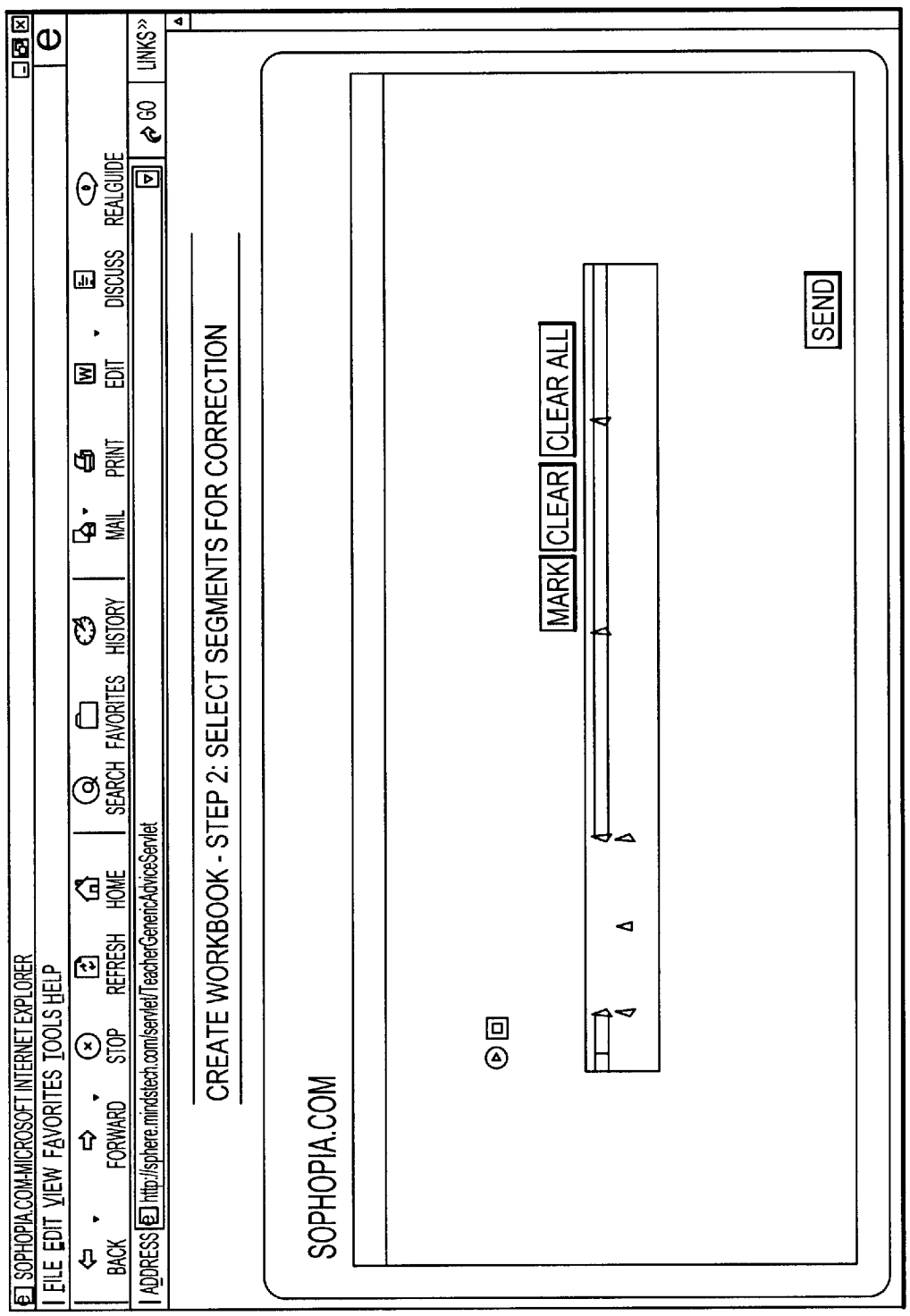
Figure 15:
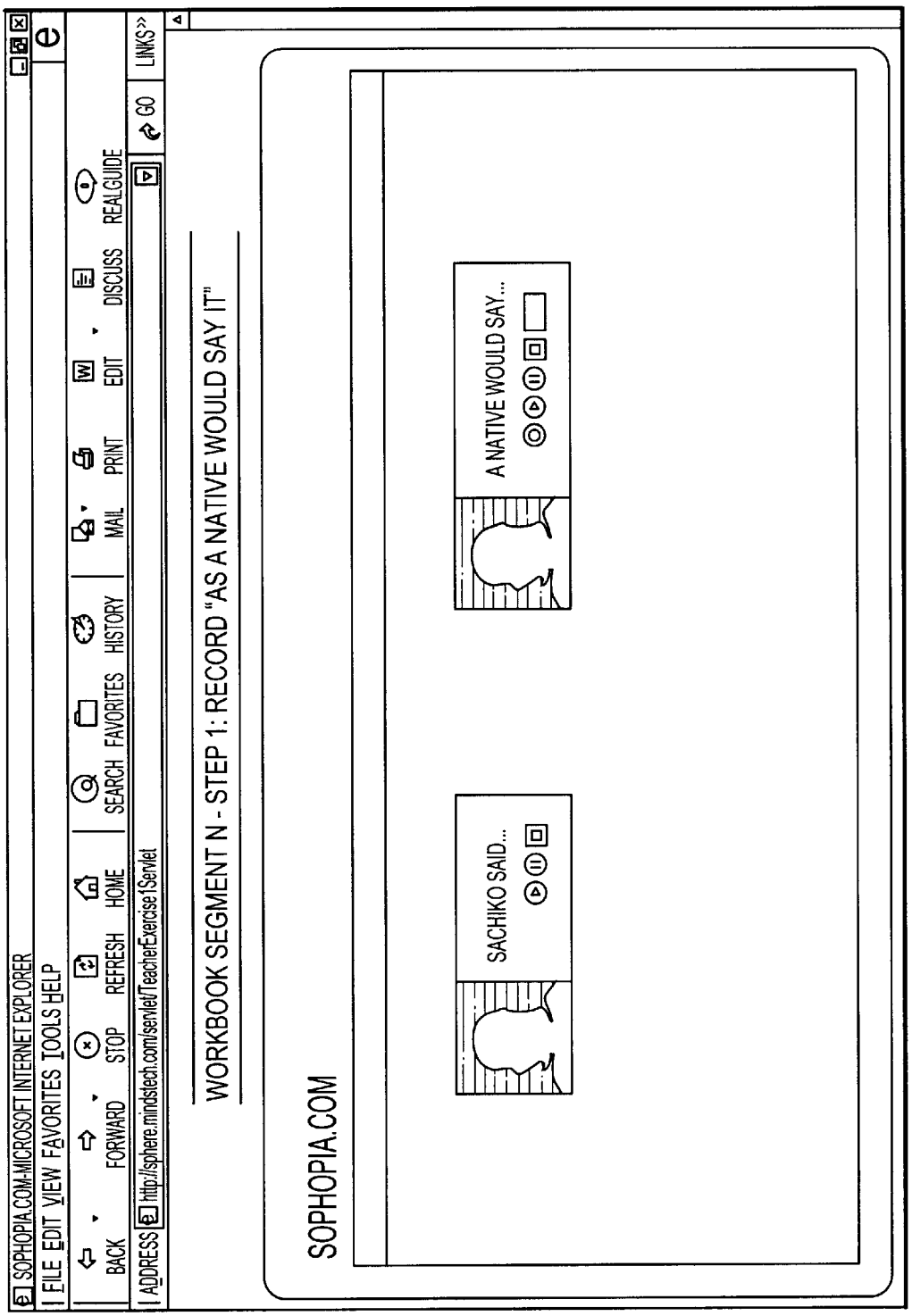
Figure 16:
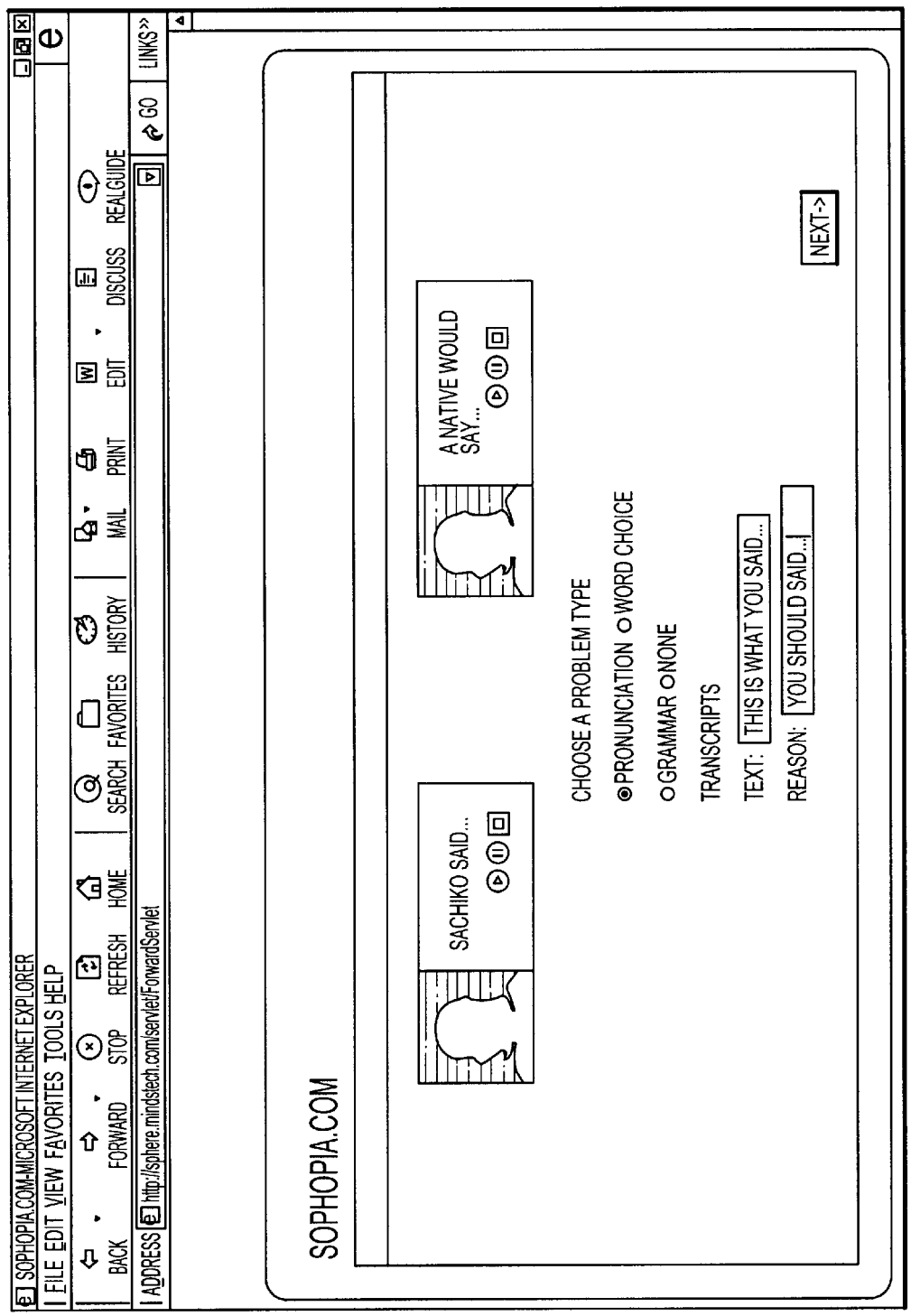

FIGS. 12–16 illustrate graphical user interfaces according to an embodiment of the present invention. FIG. 12 illustrates the GUI provided to the teacher for overall grading of the learner's performance. FIG. 13 illustrates the GUI provided to the teacher for marking segments of the learner's message for later review. FIG. 14 illustrates the GUI provided to the teacher for reviewing and moving the end points of the segments of the learner's message. FIG. 15 illustrates the GUI provided to the teacher for recording the speech the way the teacher would say it. FIG. 16 illustrates the GUI provided to the teacher for noting the type of problem in the speech segment (snippet) as well as providing textual instruction, exercises, feedback, and the like.

Although not explicitly shown, typically the teacher may point other types of errors in each learner's message. For example, the teacher may point out only three errors in each message. In such a case, it is believed that the teacher will flag only the most important speaking errors to the learner. Having substantially more than three errors being pointed out by the teacher for the message is not only burdensome for teachers, but may be discouraging to learners attempting language fluency. As a result, indication of a smaller number of errors per message is used in the current embodiments of the present invention.

Conclusion

In the foregoing specification, the invention has been described with reference to specific exemplary embodiments thereof Many changes or modifications are readily envisioned. For example, the computer network 210 may be a LAN, or other type of network.

In light of the present patent application, the addition of other functionality in alternative embodiments is envisioned. For example, on the server-side, storage of different information in the database and database queries may be provided to enhance language teaching methods. For example, the feedback from teachers to learners may be maintained and classified in any number of "common" error categories. As another example, the entire stream of messages between the learners, conversation partners, and teachers may be stored in the database. Such data may be useful for evaluating the performance of the teacher, the conversation partner, and the like.

In another embodiment, the server-side may include speech processing algorithms to convert speech to text. Such an embodiment would reduce the workload of the teacher identifying segments of speech to cut and paste into the feedback to the learner. The teachers may also have additional client software downloaded onto their computers that enable them to easily listen to the learner's message, isolate and manipulate portions of the learner's message, and use these portions (snippets) to put together exercises for the learner.

In other embodiments of the present invention, streaming media technologies may also be used to pass speech data from the database to the learner, the teacher, and/or the conversation partner. Examples of streaming media include those available from RealNetworks, Inc., and the like. In such examples, the role of cache 240 may be reduced.

In an alternative embodiment of the present invention, the web browser application program is not required. Instead, any type of client application may be developed for use on the Teacher's, Conversation Partner's, Learner's, or Administrator's computers. The client application may provide all the functionality described above.

In light of the present patent disclosure, other applications to the above technology are envisioned. For example, various aspects of "language production" may be analyzed and critiques, such as speech rate, grammar, word choice, intonation, vocabulary, pronunciation, and the like. Further, the above may be applied to music training, art training, collaborative learning, customer support, training, counseling, and the like.

The block diagrams of the architecture and flow charts are grouped for ease of understanding. However it should be understood that combinations of blocks, additions of new blocks, rearrangement of blocks, and the like are contemplated in alternative embodiments of the present invention The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for language fluency training on a computer system having an audio output device comprises:
    invoking a web browser;
    receiving a pre-recorded file including a message in a spoken language from a conversation partner;
    playing the message to a user seeking fluency training in the spoken language from within the application program on the audio output device;
    asynchronously with playing the message, recording a user file including a user message in the spoken language from the user in response to the message from within the application program;
    outputting the user file to the conversation partner and to a language instructor;
    receiving an instruction file including an instruction message in the spoken language from the language instructor in response to the user message; and
    playing the instruction message to the user from within the application program on the audio output device.

2. The method of claim 1 wherein the user file comprises audio data.

3. The method of claim 2 wherein the instruction file includes portions of the audio data from the user message.

4. The method of claim 1 wherein the instruction message includes critiques of language production of the user.

5. The method of claim 1 wherein the instruction message includes critiques of language production of the user selected from the class: grammar, pronunciation, and word choice.

6. The method of claim 1 wherein the instruction file from the language instructor comprises audio and textual data.

7. The method of claim 1 wherein the instruction message from the language instructor comprises grammatical exercises for the user.

8. The method of claim 1 wherein the conversation partner is also the language instructor.

9. The method of claim 1 wherein outputting the user file to the conversation partner and to the language instructor comprises audibly outputting the user file to the conversation partner and to the language instructor.

10. A computer program product for a computer system including a processor, and an audio output device, for language fluency training, the computer program product comprising:
    code that directs the processor to receive a recorded message in a spoken human language from a conversation partner;
    code that directs the processor to play the recorded message with the audio output device to a user who is not fluent in the spoken human language from within a web browser;
    code that directs the processor to record a user message in the spoken human language from the user after the recorded message is played from within the web browser;
    code that directs the processor to send the user message to the conversation partner and to a language instructor;
    code that directs the processor to receive an instruction message from the language instructor, the instruction message responsive to the user message; and
    code that directs the processor to play the instruction message with the audio output device to the user from within the web browser;
    wherein the codes reside in a tangible media.

11. The computer program product of claim 10 wherein the recorded message comprises audio data.

12. The computer program product of claim 11 wherein the instruction message includes portions of the user message.

13. The computer program product of claim 10 wherein the recorded message comprises audio and video data.

14. The computer program product of claim 11 wherein the instruction message includes grammatical feedback to the user.

15. The computer program product of claim 11 wherein the instruction message from the language instructor comprises grammatical exercises for the user.

16. The computer program product of claim 11 wherein the instruction message from the language instructor comprises audio and textual data.

17. The computer program product of claim 11 wherein the instruction message from the language instructor comprises pronunciation exercises for the user.

18. A computer system for language fluency training comprises:

a processor;

an audio output device coupled to the processor; and a readable memory coupled to the processor, the readable memory comprising:

code that implements a web browser;

code that directs the processor to store a recorded file comprising speech in a spoken language from a conversation partner;

code that directs the processor to play the recorded file to a user desiring to be fluent in the spoken language with the audio output device;

code that directs the processor to record a user file comprising speech from the user in the spoken language, the user file formed after the recorded file has been played;

code that directs the processor to send the user file to the conversation partner and to a language instructor;

code that directs the processor to store an instruction file from the language instructor, the instruction file formed in response to the user file; and code that directs the processor to play the instruction file to the user with the audio output device.

19. The computer system of claim 18 wherein the user file comprises audio data.

20. The computer system of claim 19 wherein the instruction file includes portions of the audio data from the user file.

21. The computer system of claim 18 wherein the user file comprises audio and video data.

22. The computer system of claim 18 wherein the instruction file includes grammatical feedback to the user.

23. The computer system of claim 18 wherein the instruction file includes pronunciation feedback to the user.

24. The computer system of claim 18 wherein the instruction file from the language instructor comprises audio and textual data.

25. The computer system of claim 18 wherein the instruction file from the language instructor comprises pronunciation exercises for the user.

* * * * *

UNITED STATES PATENT AND TRADEMARK OFFICE
CERTIFICATE OF CORRECTION

PATENT NO. : 6,302,695 B1
DATED : October 16, 2001
INVENTOR(S) : Rtischev et al.

It is certified that error appears in the above-identified patent and that said Letters Patent is hereby corrected as shown below:

Column 19,
Lines 66-67, replace "application program" with -- web browser --;

Column 20,
Line 4, replace "application program" with -- web browser --; and
Line 11, replace "application program" with -- web browser --.

Signed and Sealed this

Twenty-fourth Day of September, 2002

Attest:

JAMES E. ROGAN
Attesting Officer      Director of the United States Patent and Trademark Office